United States Patent
Patel

(10) Patent No.: US 10,362,365 B2
(45) Date of Patent: Jul. 23, 2019

(54) SYSTEMS AND METHODS FOR MANAGING AN INTERACTIVE SESSION IN AN INTERACTIVE MEDIA GUIDANCE APPLICATION

(71) Applicant: Rovi Guides, Inc., San Carlos, CA (US)

(72) Inventor: Milan Indu Patel, Santa Clara, CA (US)

(73) Assignee: Ravi Guides, Inc., San Jose, CA (US)

(*) Notice: Subject to any disclaimer, the term of this patent is extended or adjusted under 35 U.S.C. 154(b) by 26 days.

(21) Appl. No.: 15/342,658

(22) Filed: Nov. 3, 2016

(65) Prior Publication Data

US 2018/0124473 A1   May 3, 2018

(51) Int. Cl.

| | |
|---|---|
| H04N 21/81 | (2011.01) |
| H04N 21/234 | (2011.01) |
| H04N 21/2668 | (2011.01) |
| H04N 21/44 | (2011.01) |
| H04N 21/472 | (2011.01) |
| H04N 21/482 | (2011.01) |
| H04N 21/8405 | (2011.01) |
| H04N 21/8545 | (2011.01) |
| H04N 21/433 | (2011.01) |

(52) U.S. Cl.
CPC ..... *H04N 21/812* (2013.01); *H04N 21/23412* (2013.01); *H04N 21/23418* (2013.01); *H04N 21/2668* (2013.01); *H04N 21/4331* (2013.01); *H04N 21/44008* (2013.01); *H04N 21/472* (2013.01); *H04N 21/4821* (2013.01); *H04N 21/4828* (2013.01); *H04N 21/8405* (2013.01); *H04N 21/8545* (2013.01)

(58) Field of Classification Search
CPC combination set(s) only.
See application file for complete search history.

(56) References Cited

U.S. PATENT DOCUMENTS

| | | |
|---|---|---|
| 6,239,794 B1 | 5/2001 | Yuen et al. |
| 6,388,714 B1 | 5/2002 | Schein et al. |
| 6,564,378 B1 | 5/2003 | Satterfield et al. |
| 6,756,997 B1 | 6/2004 | Ward, III et al. |
| 7,165,098 B1 | 1/2007 | Boyer et al. |

(Continued)

*Primary Examiner* — Alfonso Castro
(74) *Attorney, Agent, or Firm* — Haley Guiliano LLP

(57) ABSTRACT

Systems and methods to address shortcomings in conventional systems that traditionally provide interactive television services. In some aspects, the systems and methods provide for a method for managing an interactive session in an interactive media guidance application. The interactive media guidance application receives a user selection of a media asset. The interactive media guidance application stores, in a buffer, an advertisement received during display of the media asset. The interactive media guidance application receives a user request to initiate an interactive session. The interactive media guidance application analyzes the buffer for information relating to the advertisement based on the user request to initiate the interactive session. The interactive media guidance application receives a user request for information in the interactive session. The interactive media guidance application generates for display the information relating to the advertisement based on the user request for information relating to the advertisement.

18 Claims, 8 Drawing Sheets

(56) References Cited

U.S. PATENT DOCUMENTS

| | | |
|---|---|---|
| 7,761,892 B2 | 7/2010 | Ellis et al. |
| 8,046,801 B2 | 10/2011 | Ellis et al. |
| 2002/0174430 A1 | 11/2002 | Ellis et al. |
| 2003/0093790 A1 | 5/2003 | Logan et al. |
| 2003/0110499 A1 | 6/2003 | Knudson et al. |
| 2004/0133909 A1* | 7/2004 | Ma .................... G06Q 30/0207 725/34 |
| 2005/0251827 A1 | 11/2005 | Ellis et al. |
| 2009/0235150 A1 | 9/2009 | Berry |
| 2010/0061709 A1 | 3/2010 | Agnihotri et al. |
| 2010/0153885 A1 | 6/2010 | Yates |
| 2011/0078729 A1* | 3/2011 | LaJoie ................... G11B 27/28 725/36 |
| 2012/0309511 A1* | 12/2012 | Chung ................ H04N 21/274 463/30 |
| 2013/0347033 A1 | 12/2013 | Grab et al. |
| 2015/0331949 A1 | 11/2015 | Raichelgauz et al. |
| 2016/0092447 A1 | 3/2016 | Venkataraman et al. |
| 2016/0098998 A1 | 4/2016 | Wang et al. |

\* cited by examiner

SYSTEMS AND METHODS FOR MANAGING AN INTERACTIVE SESSION IN AN INTERACTIVE MEDIA GUIDANCE APPLICATION

BACKGROUND

Television viewing today is at an all-time high. An increasing number of viewers are engaged with television viewing via interactive set-top or over-the-top boxes or similar user equipment devices. Sometimes, viewers interact with their user equipment devices to obtain more information about the products or services shown on television, e.g., products or services shown in advertisements. Conventional systems that traditionally provide interactive television services are slow to respond to such requests for information. Such slow responses may cause an unfavorable user experience as viewers today typically have multiple information sources vying for their attention and dividing their attention spans. Additionally, external devices, such as voice processing remotes, may add to delays in responding to requests for information from viewers. These external devices may slow down response time in displaying the user-requested information on the user equipment devices.

SUMMARY

Systems and methods are described to address shortcomings in conventional systems that traditionally provide interactive television services. Conventional systems do not perform prefetching or preprocessing of information in anticipation of a possible user request relating to that information. The systems and methods described herein provide for an interactive media guidance application that buffers portions of interest, such as advertisements, during transmission of a media asset, such as a television program. When a user of the interactive media guidance application invokes an interactive session, e.g., by voice command, a remote button, or another suitable invocation, the interactive media guidance application initiates prefetching and/or preprocessing of information relating to the buffered portions of interest. The rationale behind this process is that the user is likely to request information relating to the buffered portions of interest. By prefetching and/or preprocessing information related to the buffered portions of interest, the interactive media guidance application can provide quick response times to such user requests for information in the interactive session.

In some aspects, the described systems and methods provide for an interactive media guidance application implemented on a user equipment device, e.g., a set-top box or another suitable device. The interactive media guidance application may receive a media asset to generate for display, such as a television program. The media asset may include advertisements for products or services. The media asset may include portions that feature product placement for the advertised products or services. The interactive media guidance application may buffer portions of interest in memory, such as one or more of the advertisements and/or portions of the media assets with product placement. The interactive media guidance may receive metadata indicating the portions of interest to be buffered or detect the portions of interest using a suitable algorithm as described in this disclosure.

The interactive media guidance application may receive user input invoking an interactive session, e.g., by voice command, a remote button, or another suitable invocation. The user input may be received at the user equipment device or another device, such as a tablet computer, a voice-controlled device, such as AMAZON ECHO, or another suitable device. The interactive media guidance application may select one or more of the buffered portions and analyze the buffered portions for information. For example, the interactive media guidance application may select the last buffered advertisement and analyze the buffered portion for information relating to the advertisement. The interactive media guidance application may determine one or more keywords as the information relating the advertisement as described in this disclosure.

The interactive media guidance application may receive a user request for information. For example, the user may request information regarding an automobile or car featured in the last advertisement that was displayed during playback of the media asset. The interactive media guidance application may determine whether the request for information relates to the analyzed buffered portion. The interactive media guidance application may parse the user request for information and determine one or more keywords to compare against the keywords relating to the analyzed buffered portion. The interactive media guidance application may determine whether the request for information relates to the analyzed buffered portion based on the comparison. If the user request for information did relate to the analyzed buffered portion, such as the last advertisement, the interactive media guidance application may provide the requested information to the user. For example, the user may receive information regarding the automobile or car featured in the last advertisement. The rationale behind this process is that the user likely invoked the interactive session to request information relating to the last featured item, such as the automobile or car featured in the advertisement. By preprocessing and/or prefetching the information, the interactive media guidance application may reduce latency and provide a faster than traditional response to the user in the interactive session.

In some embodiments, the interactive media guidance application overlays a window of the interactive session on a full screen display of the media asset. The media asset may be paused while the user is engaged with the interactive session. Alternatively, the interactive media guidance application may continue to generate for display the media asset while the user is engaged with the interactive session. In some embodiments, the interactive media guidance application generates for display the interactive session on another device, such as a tablet computer, while the media asset is generated for display on the user equipment device. For example, the interactive media guidance application may generate for display the interactive session on the tablet computer if the interactive media guidance application detects the tablet computer in the user's wireless network. If the tablet computer is not detected in the user's wireless network, the interactive media guidance application may instead generate the interactive session in a window overlaid on a full screen display of the media asset on the user equipment device.

In some embodiments, the interactive media guidance application generates for display the user-requested information relating to the buffered portion, such as the advertisement. The interactive media guidance application may retrieve additional information regarding purchasing the advertised product or service. The interactive media guidance application may retrieve additional information regarding products or services similar to the advertised product or service. For example, if the user receives information regarding a beverage featured in the advertisement, the interactive media guidance application may retrieve additional information regarding physical stores from which to purchase the beverage or online stores from which to order the beverage for delivery. In another example, if the user receives information regarding a beverage featured in the advertisement, the interactive media guidance application may retrieve additional information regarding other beverages similar to the beverage. The user may be interested in an option that is cheaper or more readily available for purchase. On the user's request, the interactive media guidance application may provide the various options to the user for further selection.

In some embodiments, the interactive media guidance application receives a user request for information in an interactive session. For example, the user may, via a user input interface, ask a question about a product, such as "tell me about the shoes in this commercial." The user input interface may be external or internal to the user equipment device. For example, the user input interface may be a voice-controlled device, such as AMAZON ECHO, or a microphone embedded in the user equipment device or another suitable user input interface. The interactive media guidance application may retrieve a buffered portion of the media asset generated for display prior to the point in time of the user engaging with the interactive session. The interactive media guidance application may process one or more frames of the buffered portion to match what was requested. For example, the interactive media guidance application may process, using image processing algorithms, one or more frames of the buffered portion to find the shoes that were shown in the buffered portion. If the interactive media guidance application finds a match for the requested item, the interactive media guidance application may retrieve additional information about the item to present to the user on the user equipment device as an overlay while the interactive media guidance application continues to generate for display the current media asset.

In some embodiments, the interactive media guidance application provides an option to the user to add into a shopping cart the product or service featured in an advertisement or product placement in the media asset. The interactive media guidance application may include a list of online shopping websites to add the featured product or service. For example, the interactive media guidance application may include AMAZON, TARGET, MACY'S, or another suitable online shopping website. This information may be displayed on the user equipment device or another suitable device, such as the user's tablet computer.

In some embodiments, the interactive media guidance application may receive a user profile including the user's online shopping account information. The interactive media guidance application may search the websites where the user has an online shopping account and add the product or service in the user's shopping cart from the online shopping website offering the product or service for purchase. For example, if the interactive media guidance application finds that the user prefers AMAZON and has an online shopping account with it, the interactive media guidance application may search for the product or service on AMAZON and automatically add it to the shopping cart using the user's online shopping account information.

In some embodiments, the interactive media guidance application monitors and analyzes the user's interaction with the consumption of media assets. When the interactive media guidance application determines that the user is likely to use interactive sessions to retrieve information about products or services from advertisements or product placement featured in media assets, the interactive media guidance application may initiate a priority capture scheme where the interactive media guidance application may buffer one or more portions of media assets generated for display to the user.

In some embodiments, the interactive media guidance application may process items from advertisements or product placement featured in media assets and may determine keywords that are associated with the items presented in the advertisements or product placement featured in media assets. For example, an advertisement for NIKE shoes may have several items, including in the background, which the interactive media guidance application may process and store in memory prior to any user request. This process may be performed based on prior history of the user's actions and/or use of analytics. This process may provide a better user experience because the information the user is likely to request may be quickly retrieved.

In some embodiments, the interactive media guidance application receives additional information from the media asset source to allow for a better user experience. For example, the interactive media guidance application may receive the additional information embedded in the broadcast signal for the media asset. The interactive media guidance application may receive a list of items and information about the items in an advertisement or a product placement featured in the media asset. The list of items and information about the items may be embedded in the broadcast signal for the media asset. Thus, when the user wants to get information about an item, the processing time is reduced, even though more memory was used up.

In some aspects, the described systems and methods provide for a method for managing an interactive session in an interactive media guidance application. The interactive media guidance application receives a user selection of a media asset. The interactive media guidance application stores, in a buffer, an advertisement received during display of the media asset. The interactive media guidance application receives a user request to initiate an interactive session. The interactive media guidance application analyzes the buffer for information relating to the advertisement based on the user request to initiate the interactive session. The interactive media guidance application receives a user request for information relating to the advertisement in the interactive session. The interactive media guidance application generates for display the information relating to the advertisement based on the user request for information relating to the advertisement.

In some aspects, the described systems and methods provide for a method for managing an interactive session in an interactive media guidance application. The interactive media guidance application receives a user selection of a media asset, wherein the media asset includes a first advertisement and a second advertisement. The interactive media guidance application generates for display the media asset. For example, the interactive media guidance application may receive a user selection of a television program, such as "SURFERS," and generate for display the television program on a user equipment device. The interactive media guidance application detects the first advertisement being received during the display of the media asset. In some embodiments, the interactive media guidance application detects the first advertisement being received during the display of the media asset by capturing audio of a portion of the media asset. The interactive media guidance application further determines an audio signature for the audio portion.

The interactive media guidance application further compares the audio signature to a plurality of audio signatures for a corresponding plurality of advertisements. The interactive media guidance application further determines that the audio signature matches an audio signature of the plurality of audio signatures. The interactive media guidance application further selects an advertisement, of the plurality of advertisements, corresponding to the audio signature as the first advertisement. For example, the interactive media guidance application may detect an advertisement for an automobile, "BEVRO 411," being received during the display of the television program, "SURFERS."

The interactive media guidance application stores, in a buffer, the first advertisement received during display of the media asset. For example, the interactive media guidance application may store the advertisement for the automobile in a buffer in memory or another suitable location. Subsequent to the first advertisement being received and prior to the second advertisement being received, the interactive media guidance application receives a user request to initiate an interactive session. For example, the interactive media guidance application may receive a user request to initiate an interactive session a few seconds after the automobile advertisement is displayed. Based on receiving the user request to initiate the interactive session, the interactive media guidance application retrieves, from the buffer, the first advertisement received prior to the user request to initiate the interactive session. For example, the interactive media guidance application may retrieve the automobile advertisement stored in the buffer.

The interactive media guidance application analyzes the first advertisement in the buffer for data relating to the first advertisement. In some embodiments, the interactive media guidance application analyzes the first advertisement in the buffer for information relating to the first advertisement by retrieving, from the buffer, metadata associated with one or more frames of the first advertisement. The interactive media guidance application further determines, based on the metadata, a plurality of keywords relating to the first advertisement. The interactive media guidance application further stores, in the buffer, the plurality of keywords as the information relating to the first advertisement. The interactive media guidance application stores, in the buffer, the data relating to the first advertisement. For example, the interactive media guidance application may analyze the automobile advertisement to determine that the advertisement relates to "car," "automobile," and "BEVRO 411" and store this data in the buffer.

The interactive media guidance application receives a user request for information in the interactive session. For example, the interactive media guidance application may receive a user request, "what car was that." The interactive media guidance application determines whether the user request for information relates to the first advertisement. In some embodiments, the interactive media guidance application determines whether the user request for information relates to the first advertisement by parsing the user request for information into one or more keywords. The interactive media guidance application further retrieves, from the buffer, the plurality of keywords relating to the first advertisement. The interactive media guidance application further compares the parsed one or more keywords to the plurality of keywords relating to the first advertisement. The interactive media guidance application further determines whether one of the parsed one or more keywords matches one of the plurality of keywords based on the comparison. For example, the interactive media guidance application may determine that the user request "what car was that" does relate to the automobile advertisement, e.g., based on matching keyword, "car," from the user request and the automobile advertisement. Based on the user request for information being related to the first advertisement, the interactive media guidance application generates for display a portion of the data relating to the first advertisement. For example, the interactive media guidance application may generate for display a response, "that was the BEVRO 411." The interactive media guidance application may additionally prompt the user as to whether he or she would like more information.

In some embodiments, the user request for information is received subsequent to analyzing the first advertisement in the buffer for data relating to the first advertisement and storing, in the buffer, the data relating to the first advertisement. For example, the user request, "what car was that," may be received subsequent to analyzing the automobile advertisement and determining that it relates to "car," "automobile," and "BEVRO 411."

In some embodiments, based on the user request for information not being related to the first advertisement, the interactive media guidance application removes the data relating to the first advertisement from the buffer. For example, the interactive media guidance application may remove the data if the user ends the interactive session without requesting any information regarding the automobile advertisement.

In some embodiments, the interactive media guidance application detects the second advertisement being received during the display of the media asset. In some embodiments, the interactive media guidance application detects the second advertisement being received during the display of the media asset by capturing audio of a portion of the media asset. The interactive media guidance application further determines an audio signature for the audio portion. The interactive media guidance application further compares the audio signature to a plurality of audio signatures for a corresponding plurality of advertisements. The interactive media guidance application further determines that the audio signature matches an audio signature of the plurality of audio signatures. The interactive media guidance application further selects an advertisement, of the plurality of advertisements, corresponding to the audio signature as the second advertisement.

The interactive media guidance application replaces, in the buffer, the first advertisement with the second advertisement received during display of the media asset. For example, the interactive media guidance application may detect an advertisement for NIKE shoes and replace the automobile advertisement with the shoes advertisement in the buffer. In some embodiments, the interactive media guidance application may buffer two or more advertisements as they are received during display of the media asset.

In some embodiments, subsequent to the second advertisement being received and prior to completion of the media asset, the interactive media guidance application receives a second user request to initiate a second interactive session. For example, the interactive media guidance application may receive a user request to initiate an interactive session a few seconds after the shoes advertisement is displayed. Based on receiving the second user request to initiate the second interactive session, the interactive media guidance application retrieves, from the buffer, the second advertisement received prior to the second user request to initiate the second interactive session. For example, the interactive media guidance application may retrieve the shoes advertisement stored in the buffer.

The interactive media guidance application analyzes the second advertisement in the buffer for data relating to the second advertisement. In some embodiments, the interactive media guidance application analyzes the second advertisement in the buffer for information relating to the second advertisement by retrieving, from the buffer, metadata associated with one or more frames of the second advertisement. The interactive media guidance application further determines, based on the metadata, a plurality of keywords relating to the second advertisement. The interactive media guidance application further stores, in the buffer, the plurality of keywords as the information relating to the second advertisement. The interactive media guidance application stores, in the buffer, the data relating to the second advertisement. For example, the interactive media guidance application may analyze the shoes advertisement to determine that the advertisement relates to "shoes," "sneakers," and "NIKE" and store this data in the buffer.

The interactive media guidance application receives a second user request for information in the second interactive session. For example, the interactive media guidance application may receive a user request, "what shoe was that." The interactive media guidance application determines whether the second user request for information relates to the second advertisement. In some embodiments, the interactive media guidance application determines whether the user request for information relates to the second advertisement by parsing the user request for information into one or more keywords. The interactive media guidance application further retrieves, from the buffer, the plurality of keywords relating to the second advertisement. The interactive media guidance application further compares the parsed one or more keywords to the plurality of keywords relating to the second advertisement. The interactive media guidance application further determines whether one of the parsed one or more keywords matches one of the plurality of keywords based on the comparison. For example, the interactive media guidance application may determine that the user request "what shoe was that" does relate to the shoes advertisement, e.g., based on matching keyword, "shoe," from the user request and the shoes advertisement.

Based on the second user request for information being related to the second advertisement, the interactive media guidance application generates for display a portion of the data relating to the second advertisement. For example, the interactive media guidance application may generate for display a response, "that was the latest NIKE sneakers." The interactive media guidance application may additionally prompt the user as to whether he or she would like more information.

In some embodiments, based on the second user request for information not being related to the second advertisement, the interactive media guidance application removes the data relating to the second advertisement from the buffer. For example, the interactive media guidance application may remove the data if the user ends the interactive session without requesting any information regarding the shoes advertisement.

In some embodiments, the interactive media guidance application removes the second advertisement from the buffer subsequent to completion of the media asset. For example, the interactive media guidance application may remove the shoes advertisement when the television program "SURFERS" has completed playback. In embodiments where two or more advertisements were buffered, the interactive media guidance application may remove all buffered advertisements when the television program has completed playback.

It should be noted that the systems, methods, apparatuses, and/or aspects described above may be applied to, or used in accordance with, other systems, methods, apparatuses, and/or aspects described in this disclosure.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
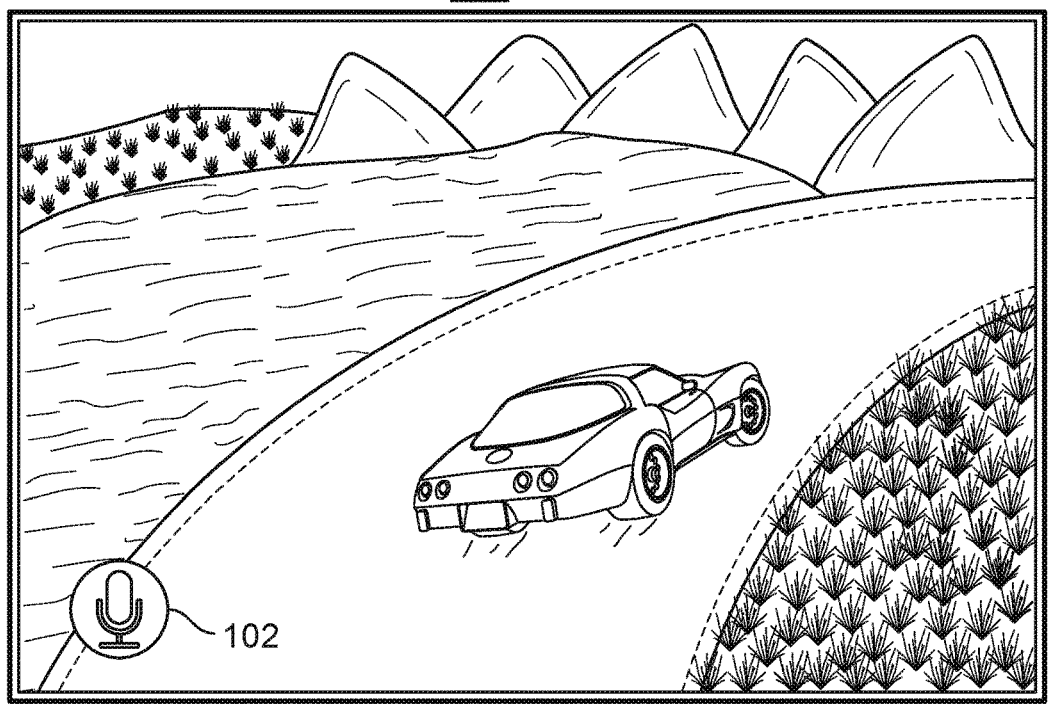
FIG. 1 shows an illustrative example of a display screen generated by a media guidance application in accordance with some embodiments of the disclosure.

Systems and methods are described to address shortcomings in conventional systems that traditionally provide interactive television services. Conventional systems do not perform prefetching or preprocessing of information in anticipation of a possible user request relating to that information. The systems and methods described herein provide for an interactive media guidance application that buffers portions of interest, such as advertisements, during transmission of a media asset, such as a television program.

When a user of the interactive media guidance application invokes an interactive session, e.g., by voice command, a remote button, or another suitable invocation, the interactive media guidance application initiates prefetching and/or preprocessing of information relating to the buffered portions of interest. The rationale behind this process is that the user is likely to request information relating to the buffered portions of interest. By prefetching and/or preprocessing information related to the buffered portions of interest, the interactive media guidance application can provide quick response times to such user requests for information in the interactive session.

In some aspects, the described systems and methods provide for a method for managing an interactive session in an interactive media guidance application. The interactive media guidance application receives a user selection of a media asset. The interactive media guidance application stores, in a buffer, an advertisement received during display of the media asset. The interactive media guidance application receives a user request to initiate an interactive session. The interactive media guidance application analyzes the buffer for information relating to the advertisement based on the user request to initiate the interactive session. The interactive media guidance application receives a user request for information relating to the advertisement in the interactive session. The interactive media guidance application generates for display the information relating to the advertisement based on the user request for information relating to the advertisement.

In some aspects, the described systems and methods provide for an interactive media guidance application implemented on a user equipment device, e.g., a set-top box or another suitable device. The interactive media guidance application may receive a media asset to generate for display, such as a television program. The media asset may include advertisements for products or services. The media asset may include portions that feature product placement for the advertised products or services. The interactive media guidance application may buffer portions of interest in memory, such as one or more of the advertisements and/or portions of the media assets with product placement. The interactive media guidance may receive metadata indicating the portions of interest to be buffered or detect the portions of interest using a suitable algorithm as described in this disclosure.

The interactive media guidance application may receive user input invoking an interactive session, e.g., by voice command, a remote button, or another suitable invocation. The user input may be received at the user equipment device or another device, such as a tablet computer, a voice-controlled device, such as AMAZON ECHO, or another suitable device. The interactive media guidance application may select one or more of the buffered portions and analyze the buffered portions for information. For example, the interactive media guidance application may select the last buffered advertisement and analyze the buffered portion for information relating to the advertisement. The interactive media guidance application may determine one or more keywords as the information relating the advertisement as described in this disclosure.

The interactive media guidance application may receive a user request for information. For example, the user may request information regarding an automobile or car featured in the last advertisement that was displayed during playback of the media asset. The interactive media guidance application may determine whether the request for information relates to the analyzed buffered portion. The interactive media guidance application may parse the user request for information and determine one or more keywords to compare against the keywords relating to the analyzed buffered portion. The interactive media guidance application may determine whether the request for information relates to the analyzed buffered portion based on the comparison. If the user request for information did relate to the analyzed buffered portion, such as the last advertisement, the interactive media guidance application may provide the requested information to the user. For example, the user may receive information regarding the automobile or car featured in the last advertisement. The rationale behind this process is that the user likely invoked the interactive session to request information relating to the last featured item, such as the automobile or car featured in the advertisement. By preprocessing and/or prefetching the information, the interactive media guidance application may reduce latency and provide a faster than traditional response to the user in the interactive session.

Figure 7:
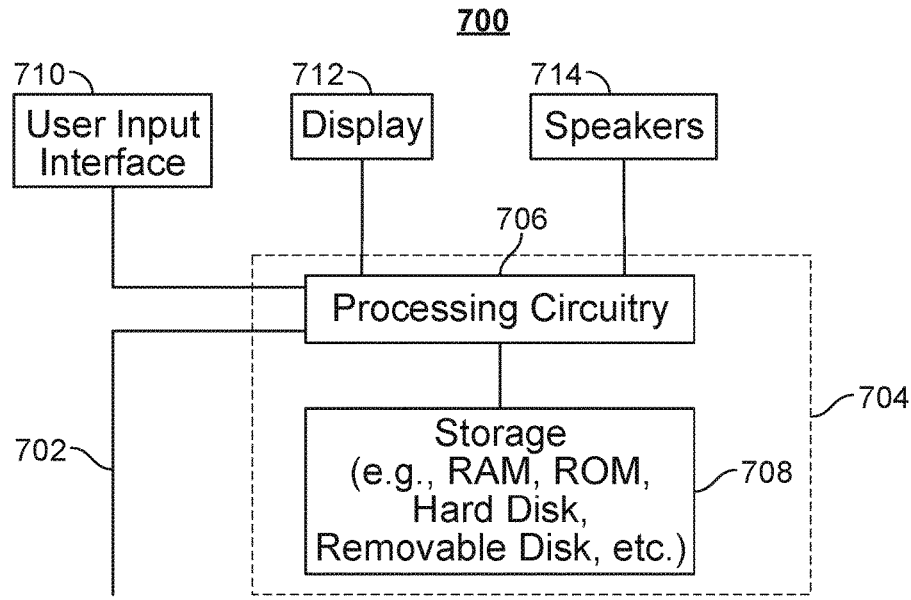
FIG. 7 is a block diagram of an illustrative user equipment device in accordance with some embodiments of the disclosure.

FIGS. 1-4 show illustrative examples of display screens 100-400 generated by the interactive media guidance application in accordance with some embodiments of the disclosure. The interactive media guidance application, being executed on, e.g., a user equipment device 700 (FIG. 7), may receive, via user input interface 710 (FIG. 7), a user selection of a television program, such as "SURFERS," and generate for display the television program on display 712 (FIG. 7). The interactive media guidance application may detect an advertisement, as shown in FIG. 1, for an automobile, "BEVRO 411," being received during the display of the television program, "SURFERS." The interactive media guidance application may store the advertisement for the automobile in a buffer in memory, e.g., storage 708 (FIG. 7), or another suitable location. The interactive media guidance application may receive a user selection of voice input interface 102. The interactive media guidance application may receive a user request to initiate an interactive session a few seconds after the automobile advertisement is displayed. For example, the user may initiate the interactive session by selecting voice input interface 102. For example, the voice input interface may be provided in a voice-controlled device, such as AMAZON ECHO, or a microphone embedded in the user equipment device or another suitable voice input interface.

Figure 2:
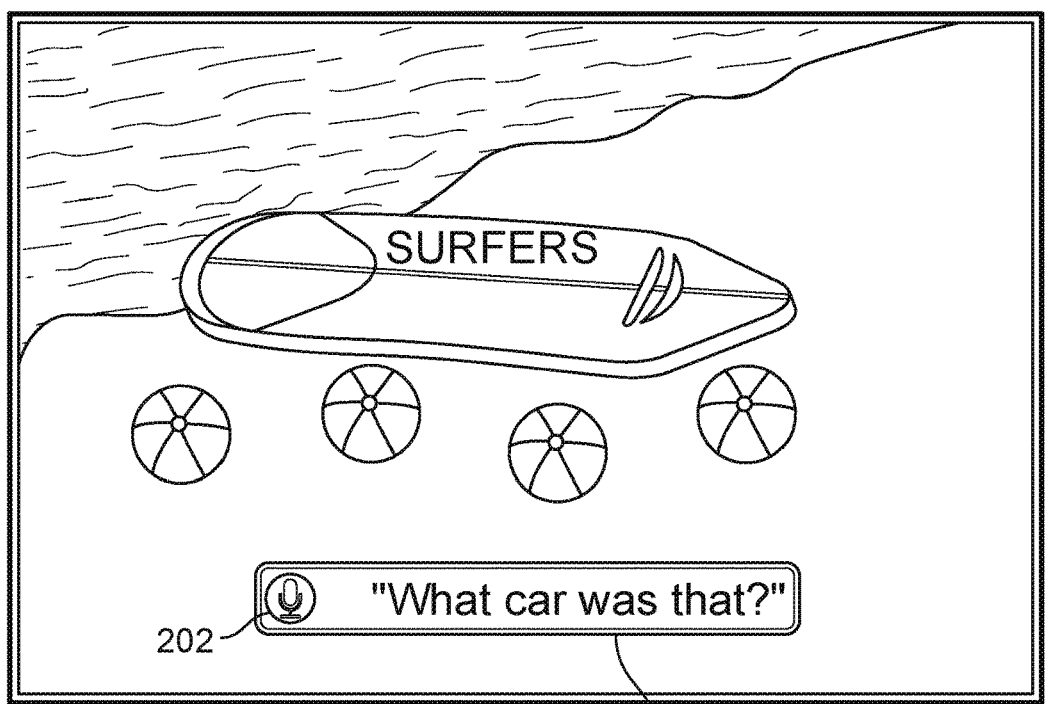
FIG. 2 shows another illustrative example of a display screen generated by a media guidance application in accordance with some embodiments of the disclosure.

Based on receiving the user request to initiate the interactive session, the interactive media guidance application may retrieve the automobile advertisement stored in the buffer. The interactive media guidance application may analyze the automobile advertisement to determine that the advertisement relates to "car," "automobile," and "BEVRO 411" and store this data in the buffer. The interactive media guidance application may receive a user request 204 via voice input interface 202, "what car was that," as shown in FIG. 2. The interactive media guidance application may determine that the user request "what car was that" does relate to the automobile advertisement, e.g., based on matching keyword, "car," from the user request and the automobile advertisement.

Figure 3:
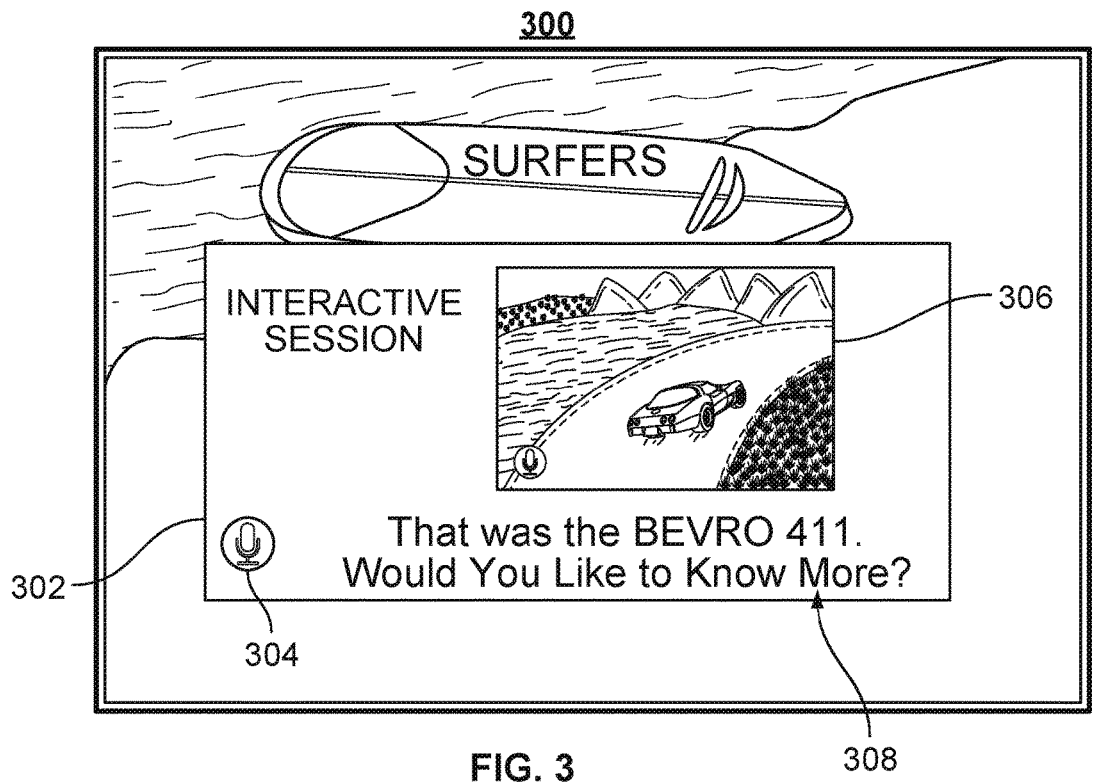
FIG. 3 shows yet another illustrative example of a display screen generated by a media guidance application in accordance with some embodiments of the disclosure.

Based on the user request for information being related to the first advertisement, the interactive media guidance application may generate for display a window 306 and a response 308, "that was the BEVRO 411," as shown in FIG. 3. The interactive media guidance application may additionally prompt the user as to whether he or she would like more information. The user may select voice input interface 304 to further interact with the interactive session. In some embodiments, the interactive media guidance application overlays a window 302 of the interactive session on a full screen display 300 of the media asset. The media asset may be paused while the user is engaged with the interactive session. Alternatively, the interactive media guidance application may continue to generate for display the media asset while the user is engaged with the interactive session. In some embodiments, the interactive media guidance application generates for display the interactive session on another device, such as a tablet computer, while the media asset is generated for display on the user equipment device. For example, the interactive media guidance application may generate for display the interactive session on the tablet computer if the interactive media guidance application detects the tablet computer in the user's wireless network. If the tablet computer is not detected in the user's wireless network, the interactive media guidance application may instead generate the interactive session in a window overlaid on a full screen display of the media asset on the user equipment device.

Figure 4:
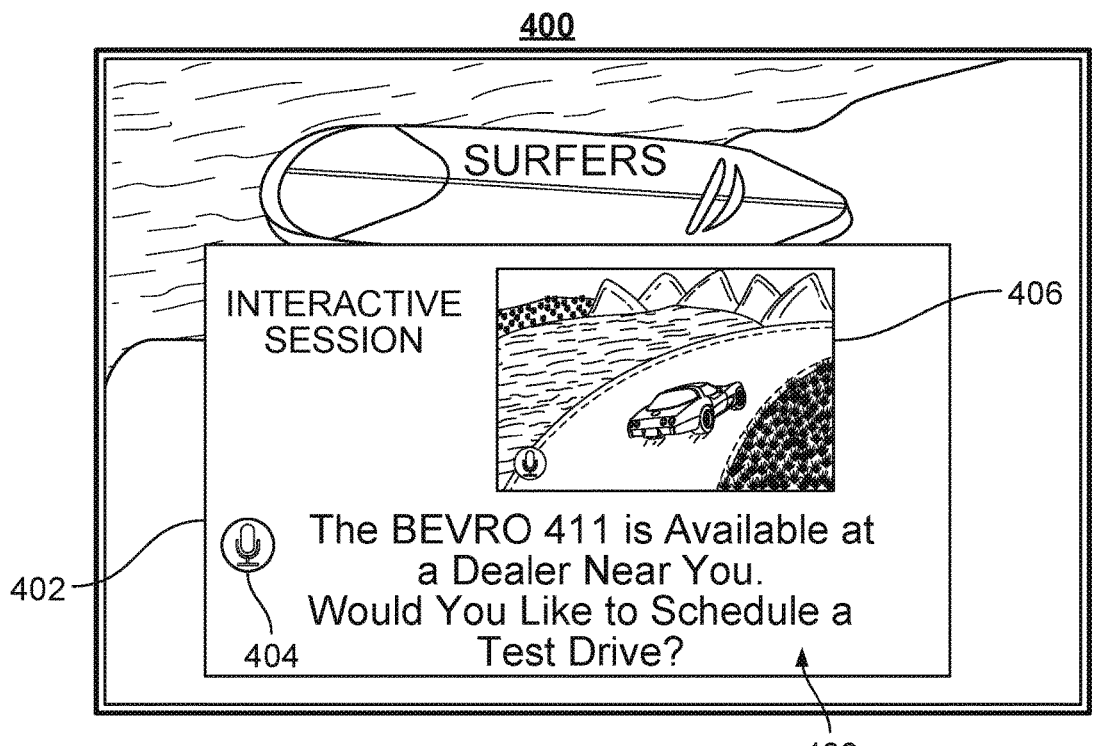
FIG. 4 shows yet another illustrative example of a display screen generated by a media guidance application in accordance with some embodiments of the disclosure.

In some embodiments, the interactive media guidance application generates for display the user-requested information relating to the buffered portion, such as the advertisement. The interactive media guidance application may retrieve additional information regarding purchasing the advertised product or service. As shown in FIG. 4, within the interactive session window 402, the interactive media guidance application may generate for display a window 406 and prompt 408 with additional information. The user may select voice input interface 404 to further interact with the interactive session. For example, the voice input interface may be provided in a voice-controlled device, such as AMAZON ECHO, or a microphone embedded in the user equipment device or another suitable voice input interface.

In some embodiments, the interactive media guidance application may retrieve additional information regarding products or services similar to the advertised product or service. For example, if the user receives information regarding a beverage featured in the advertisement, the interactive media guidance application may retrieve additional information regarding physical stores from which to purchase the beverage or online stores from which to order the beverage for delivery. In another example, if the user receives information regarding a beverage featured in the advertisement, the interactive media guidance application may retrieve additional information regarding other beverages similar to the beverage. The user may be interested in an option that is cheaper or more readily available for purchase. On the user's request, the interactive media guidance application may provide the various options to the user for further selection.

In some embodiments, the interactive media guidance application receives a user request for information in an interactive session. For example, the user may, via a user input interface, ask a question about a product, such as "tell me about the shoes in this commercial." The user input interface may be external or internal to the user equipment device. For example, the user input interface may be a voice-controlled device, such as AMAZON ECHO, or a microphone embedded in the user equipment device or another suitable user input interface. The interactive media guidance application may retrieve a buffered portion of the media asset generated for display prior to the point in time of the user engaging with the interactive session. The interactive media guidance application may process one or more frames of the buffered portion to match what was requested. For example, the interactive media guidance application may process, using image processing algorithms, one or more frames of the buffered portion to find the shoes that were shown in buffered portion. If the interactive media guidance application finds a match for the requested item, the interactive media guidance application may retrieve additional information about the item to present to the user on the user equipment device as an overlay while the interactive media guidance application continues to generate for display the current media asset.

In some embodiments, the interactive media guidance application provides an option to the user to add into a shopping cart the product or service featured in an advertisement or product placement in the media asset. The interactive media guidance application may include a list of online shopping websites to add the featured product or service. For example, the interactive media guidance application may include AMAZON, TARGET, MACY'S, or another suitable online shopping website. This information may be displayed on the user equipment device or another suitable device, such as the user's tablet computer.

In some embodiments, the interactive media guidance application may receive a user profile including the user's online shopping account information. The interactive media guidance application may search the websites where the user has an online shopping account and add the product or service in the user's shopping cart from the online shopping website offering the product or service for purchase. For example, if the interactive media guidance application finds that the user prefers AMAZON and has an online shopping account with it, the interactive media guidance application may search for the product or service on AMAZON and automatically add it to the shopping cart using the user's online shopping account information.

In some embodiments, the interactive media guidance application monitors and analyzes the user's interaction with the consumption of media assets. When the interactive media guidance application determines that the user is likely to use interactive sessions to retrieve information about products or services from advertisements or product placement featured in media assets, the interactive media guidance application may initiate a priority capture scheme where the interactive media guidance application may buffer one or more portions of media assets generated for display to the user.

In some embodiments, the interactive media guidance application may process items from advertisements or product placement featured in media assets and may determine keywords that are associated with the items presented in the advertisements or product placement featured in media assets. For example, an advertisement for NIKE shoes may have several items, including in the background, which the interactive media guidance application may process and store in memory prior to any user request. This process may be performed based on prior history of the user's actions and/or use of analytics. This process may provide a better user experience because the information the user is likely to request may be quickly retrieved.

In some embodiments, the interactive media guidance application receives additional information from the media asset source to allow for a better user experience. For example, the interactive media guidance application may receive the additional information embedded in the broadcast signal for the media asset. The interactive media guidance application may receive a list of items and information about the items in an advertisement or a product placement featured in the media asset. The list of items and information about the items may be embedded in the broadcast signal for the media asset. Thus, when the user wants to get information about an item, the processing time is reduced, even though more memory was used up.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, advertisements, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a website), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), advertisement information (e.g., text, images, media clips, etc.), on-demand information, blogs, websites, and any other type of guidance data that is helpful for a user to navigate among and locate desired content selections.

Figure 5:
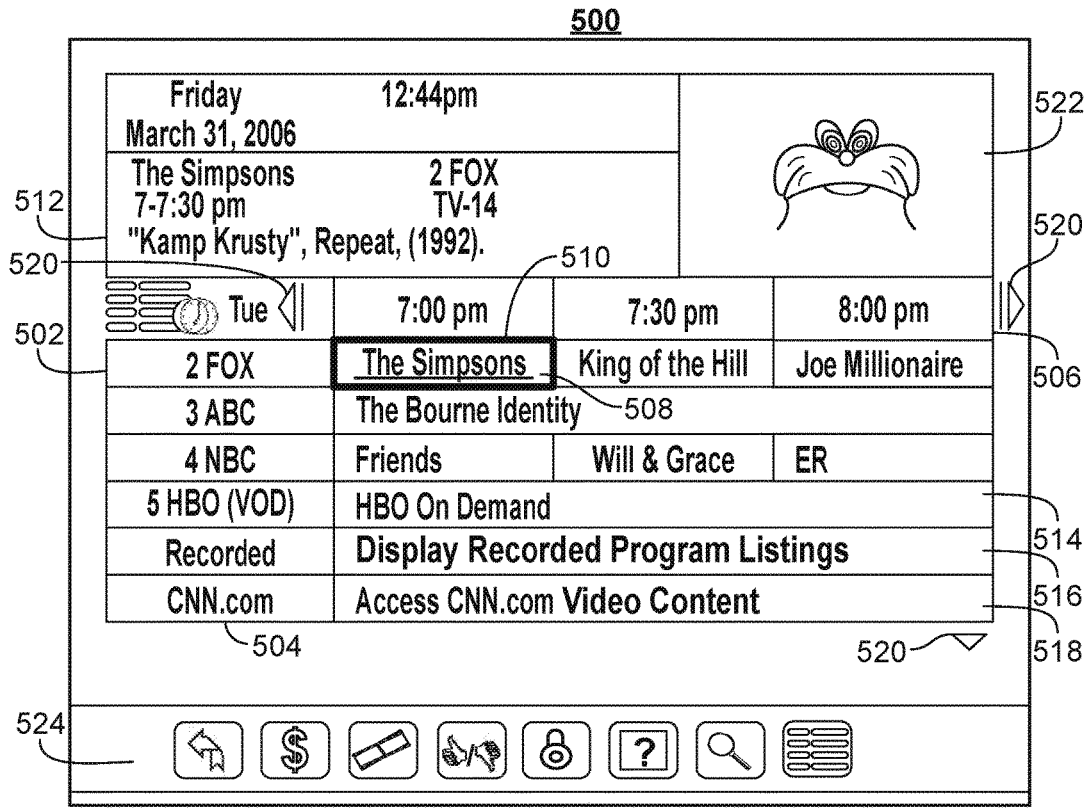
FIG. 5 shows yet another illustrative example of a display screen generated by a media guidance application in accordance with some embodiments of the disclosure.
Figure 6:
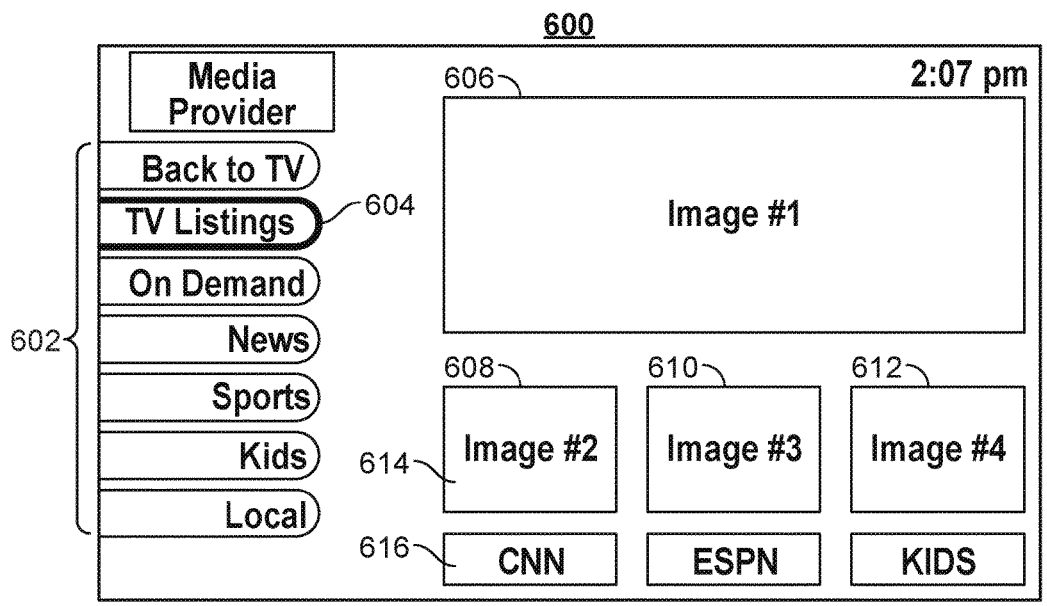
FIG. 6 shows yet another illustrative example of a display screen generated by a media guidance application in accordance with some embodiments of the disclosure.

FIGS. 5-6 show illustrative display screens that may be used to provide media guidance data. The display screens shown in FIGS. 5-6 may be implemented on any suitable user equipment device or platform. While the displays of FIGS. 5-6 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 5 shows illustrative grid of a program listings display 500 arranged by time and channel that also enables access to different types of content in a single display. Display 500 may include grid 502 with: (1) a column of channel/content type identifiers 504, where each channel/content type identifier (which is a cell in the column) identifies a different channel or content type available; and (2) a row of time identifiers 506, where each time identifier (which is a cell in the row) identifies a time block of programming. Grid 502 also includes cells of program listings, such as program listing 508, where each listing provides the title of the program provided on the listing's associated channel and time. With a user input device, a user can select program listings by moving highlight region 510. Information relating to the program listing selected by highlight region 510 may be provided in program information region 512. Region 512 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet website or other Internet access (e.g. FTP).

Grid 502 may provide media guidance data for non-linear programming including on-demand listing 514, recorded content listing 516, and Internet content listing 518. A display combining media guidance data for content from different types of content sources is sometimes referred to as a "mixed-media" display. Various permutations of the types of media guidance data that may be displayed that are different than display 500 may be based on user selection or guidance application definition (e.g., a display of only recorded and broadcast listings, only on-demand and broadcast listings, etc.). As illustrated, listings 514, 516, and 518 are shown as spanning the entire time block displayed in grid 502 to indicate that selection of these listings may provide access to a display dedicated to on-demand listings, recorded listings, or Internet listings, respectively. In some embodiments, listings for these content types may be included directly in grid 502. Additional media guidance data may be displayed in response to the user selecting one of the navigational icons 520. (Pressing an arrow key on a user input device may affect the display in a similar manner as selecting navigational icons 520.)

Display 500 may also include video region 522, advertisement 524, and options region 526. Video region 522 may allow the user to view and/or preview programs that are currently available, will be available, or were available to the user. The content of video region 522 may correspond to, or be independent from, one of the listings displayed in grid 502. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Advertisement 524 may provide an advertisement for content that, depending on a viewer's access rights (e.g., for subscription programming), is currently available for viewing, will be available for viewing in the future, or may never become available for viewing, and may correspond to or be unrelated to one or more of the content listings in grid 502. Advertisement 524 may also be for products or services related or unrelated to the content displayed in grid 502. Advertisement 524 may be selectable and provide further information about content, provide information about a product or a service, enable purchasing of content, a product, or a service, provide content relating to the advertisement, etc. Advertisement 524 may be targeted based on a user's profile/preferences, monitored user activity, the type of display provided, or on other suitable targeted advertisement bases.

While advertisement 524 is shown as rectangular or banner shaped, advertisements may be provided in any suitable size, shape, and location in a guidance application display. For example, advertisement 524 may be provided as a rectangular shape that is horizontally adjacent to grid 502. This is sometimes referred to as a panel advertisement. In addition, advertisements may be overlaid over content or a guidance application display or embedded within a display. Advertisements may also include text, images, rotating images, video clips, or other types of content described above. Advertisements may be stored in a user equipment device having a guidance application, in a database connected to the user equipment, in a remote location (including streaming media servers), or on other storage means, or a combination of these locations. Providing advertisements in a media guidance application is discussed in greater detail in, for example, Knudson et al., U.S. Patent Application Publication No. 2003/0110499, filed Jan. 17, 2003; Ward, III et al. U.S. Pat. No. 6,756,997, issued Jun. 29, 2004; and Schein et al. U.S. Pat. No. 6,388,714, issued May 14, 2002, which are hereby incorporated by reference herein in their entireties. It will be appreciated that advertisements may be included in other media guidance application display screens of the embodiments described herein.

Options region 526 may allow the user to access different types of content, media guidance application displays, and/or media guidance application features. Options region 526 may be part of display 500 (and other display screens described herein), or may be invoked by a user by selecting an on-screen option or pressing a dedicated or assignable button on a user input device. The selectable options within options region 526 may concern features related to program listings in grid 502 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other websites on the Internet the user accesses, such as www.allrovi.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 8. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 6. Video mosaic display 600 includes selectable options 602 for content information organized based on content type, genre, and/or other organization criteria. In display 600, television listings option 604 is selected, thus providing listings 606, 608, 610, and 612 as broadcast program listings. In display 600 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 608 may include more than one portion, including media portion 614 and text portion 616. Media portion 614 and/or text portion 616 may be selectable to view content in full-screen or to view information related to the content displayed in media portion 614 (e.g., to view listings for the channel that the video is displayed on).

The listings in display 600 are of different sizes (i.e., listing 606 is larger than listings 608, 610, and 612), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Users may access content and the media guidance application (and its display screens described above and below) from one or more of their user equipment devices. FIG. 7 shows a generalized embodiment of illustrative user equipment device 700. More specific implementations of user equipment devices are discussed below in connection with FIG. 8. User equipment device 700 may receive content and data via input/output (hereinafter "I/O") path 702. I/O path 702 may provide content (e.g., broadcast programming, on-demand programming, Internet content, content available over a local area network (LAN) or wide area network (WAN), and/or other content) and data to control circuitry 704, which includes processing circuitry 706 and storage 708. Control circuitry 704 may be used to send and receive commands, requests, and other suitable data using I/O path 702. I/O path 702 may connect control circuitry 704 (and specifically processing circuitry 706) to one or more communications paths (described below). I/O functions may be provided by one or more of these communications paths, but are shown as a single path in FIG. 7 to avoid overcomplicating the drawing.

Control circuitry 704 may be based on any suitable processing circuitry such as processing circuitry 706. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 704 executes instructions for a media guidance application stored in memory (i.e., storage 708). Specifically, control circuitry 704 may be instructed by the media guidance application to perform the functions discussed above and below. For example, the media guidance application may provide instructions to control circuitry 704 to generate the media guidance displays. In some implementations, any action performed by control circuitry 704 may be based on instructions received from the media guidance application.

In client-server based embodiments, control circuitry 704 may include communications circuitry suitable for communicating with a guidance application server or other networks or servers. The instructions for carrying out the above mentioned functionality may be stored on the guidance application server. Communications circuitry may include a cable modem, an integrated services digital network (ISDN)

modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 8). In addition, communications circuitry may include circuitry that enables peer-to-peer communication of user equipment devices, or communication of user equipment devices in locations remote from each other (described in more detail below).

Memory may be an electronic storage device provided as storage 708 that is part of control circuitry 704. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 708 may be used to store various types of content described herein as well as media guidance data described above. Nonvolatile memory may also be used (e.g., to launch a boot-up routine and other instructions). Cloud-based storage, described in relation to FIG. 8, may be used to supplement storage 708 or instead of storage 708.

Control circuitry 704 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 704 may also include scaler circuitry for upconverting and downconverting content into the preferred output format of the user equipment 700. Circuitry 704 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 708 is provided as a separate device from user equipment 700, the tuning and encoding circuitry (including multiple tuners) may be associated with storage 708.

A user may send instructions to control circuitry 704 using user input interface 710. User input interface 710 may be any suitable user interface, such as a remote control, mouse, trackball, keypad, keyboard, touch screen, touchpad, stylus input, joystick, voice recognition interface, or other user input interfaces. Display 712 may be provided as a stand-alone device or integrated with other elements of user equipment device 700. For example, display 712 may be a touchscreen or touch-sensitive display. In such circumstances, user input interface 710 may be integrated with or combined with display 712. Display 712 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 712 may be HDTV-capable. In some embodiments, display 712 may be a 3D display, and the interactive media guidance application and any suitable content may be displayed in 3D. A video card or graphics card may generate the output to the display 712. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 704. The video card may be integrated with the control circuitry 704. Speakers 714 may be provided as integrated with other elements of user equipment device 700 or may be stand-alone units. The audio component of videos and other content displayed on display 712 may be played through speakers 714. In some embodiments, the audio may be distributed to a receiver (not shown), which processes and outputs the audio via speakers 714.

The guidance application may be implemented using any suitable architecture. For example, it may be a stand-alone application wholly-implemented on user equipment device 700. In such an approach, instructions of the application are stored locally (e.g., in storage 708), and data for use by the application is downloaded on a periodic basis (e.g., from an out-of-band feed, from an Internet resource, or using another suitable approach). Control circuitry 704 may retrieve instructions of the application from storage 708 and process the instructions to generate any of the displays discussed herein. Based on the processed instructions, control circuitry 704 may determine what action to perform when input is received from input interface 710. For example, movement of a cursor on a display up/down may be indicated by the processed instructions when input interface 710 indicates that an up/down button was selected.

In some embodiments, the media guidance application is a client-server based application. Data for use by a thick or thin client implemented on user equipment device 700 is retrieved on-demand by issuing requests to a server remote to the user equipment device 700. In one example of a client-server based guidance application, control circuitry 704 runs a web browser that interprets web pages provided by a remote server. For example, the remote server may store the instructions for the application in a storage device. The remote server may process the stored instructions using circuitry (e.g., control circuitry 704) and generate the displays discussed above and below. The client device may receive the displays generated by the remote server and may display the content of the displays locally on equipment device 700. This way, the processing of the instructions is performed remotely by the server while the resulting displays are provided locally on equipment device 700. Equipment device 700 may receive inputs from the user via input interface 710 and transmit those inputs to the remote server for processing and generating the corresponding displays.

For example, equipment device 700 may transmit a communication to the remote server indicating that an up/down button was selected via input interface 710. The remote server may process instructions in accordance with that input and generate a display of the application corresponding to the input (e.g., a display that moves a cursor up/down). The generated display is then transmitted to equipment device 700 for presentation to the user.

In some embodiments, the media guidance application is downloaded and interpreted or otherwise run by an interpreter or virtual machine (run by control circuitry 704). In some embodiments, the guidance application may be encoded in the ETV Binary Interchange Format (EBIF), received by control circuitry 704 as part of a suitable feed, and interpreted by a user agent running on control circuitry 704. For example, the guidance application may be an EBIF application. In some embodiments, the guidance application may be defined by a series of JAVA-based files that are received and run by a local virtual machine or other suitable middleware executed by control circuitry 704. In some of such embodiments (e.g., those employing MPEG-2 or other digital media encoding schemes), the guidance application may be, for example, encoded and transmitted in an MPEG-2 object carousel with the MPEG audio and video packets of a program.

Figure 8:
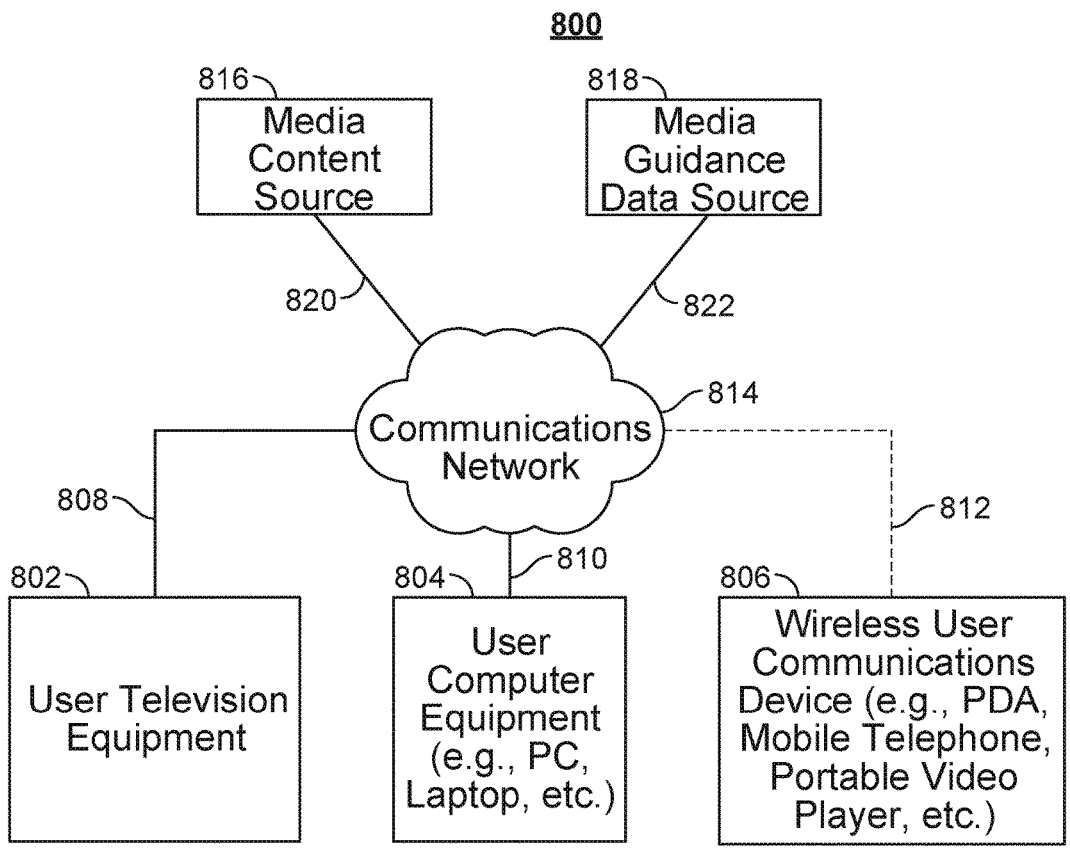
FIG. 8 is a block diagram of an illustrative media system in accordance with some embodiments of the disclosure.

User equipment device 700 of FIG. 7 can be implemented in system 800 of FIG. 8 as user television equipment 802, user computer equipment 804, wireless user communications device 806, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 7 may not be classified solely as user television equipment 802, user computer equipment 804, or a wireless user communications device 806. For example, user television equipment 802 may, like some user computer equipment 804, be Internet-enabled allowing for access to Internet content, while user computer equipment 804 may, like some user television equipment 802, include a tuner allowing for access to television programming. The media guidance application may have the same layout on various different types of user equipment or may be tailored to the display capabilities of the user equipment. For example, on user computer equipment 804, the guidance application may be provided as a website accessed by a web browser. In another example, the guidance application may be scaled down for wireless user communications devices 806.

In system 800, there is typically more than one of each type of user equipment device but only one of each is shown in FIG. 8 to avoid overcomplicating the drawing. In addition, each user may utilize more than one type of user equipment device and also more than one of each type of user equipment device.

In some embodiments, a user equipment device (e.g., user television equipment 802, user computer equipment 804, wireless user communications device 806) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the website www.allrovi.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 814. Namely, user television equipment 802, user computer equipment 804, and wireless user communications device 806 are coupled to communications network 814 via communications paths 808, 810, and 812, respectively. Communications network 814 may be one or more networks including the Internet, a mobile phone network, mobile voice or data network (e.g., a 4G or LTE network), cable network, public switched telephone network, or other types of communications network or combinations of communications networks. Paths 808, 810, and 812 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 812 is drawn with dotted lines to indicate that in the exemplary embodiment shown in FIG. 8 it is a wireless path and paths 808 and 810 are drawn as solid lines to indicate they are wired paths (although these paths may be wireless paths, if desired). Communications with the user equipment devices may be provided by one or more of these communications paths, but are shown as a single path in FIG. 8 to avoid overcomplicating the drawing.

Although communications paths are not drawn between user equipment devices, these devices may communicate directly with each other via communication paths, such as those described above in connection with paths 808, 810, and 812, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 814.

System 800 includes content source 816 and media guidance data source 818 coupled to communications network 814 via communication paths 820 and 822, respectively. Paths 820 and 822 may include any of the communication paths described above in connection with paths 808, 810, and 812. Communications with the content source 816 and media guidance data source 818 may be exchanged over one or more communications paths, but are shown as a single path in FIG. 8 to avoid overcomplicating the drawing. In addition, there may be more than one of each of content source 816 and media guidance data source 818, but only one of each is shown in FIG. 8 to avoid overcomplicating the drawing. (The different types of each of these sources are discussed below.) If desired, content source 816 and media guidance data source 818 may be integrated as one source device. Although communications between sources 816 and 818 with user equipment devices 802, 804, and 806 are shown as through communications network 814, in some embodiments, sources 816 and 818 may communicate directly with user equipment devices 802, 804, and 806 via communication paths (not shown) such as those described above in connection with paths 808, 810, and 812.

Content source 816 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 816 may be the originator of content (e.g., a television broadcaster, a Webcast provider, etc.) or may not be the originator of content (e.g., an on-demand content provider, an Internet provider of content of broadcast programs for downloading, etc.). Content source 816 may include cable sources, satellite providers, on-demand providers, Internet providers, over-the-top content providers, or other providers of content. Content source 816 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 818 may provide media guidance data, such as the media guidance data described above. Media guidance data may be provided to the user equipment devices using any suitable approach. In some embodiments, the guidance application may be a standalone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 818 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 818 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 818 may provide user equipment devices 802, 804, and 806 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions and advertisements that entice the user to keep the particular service or source indicated by the score as one to which the user will likely terminate access.

Media guidance applications may be, for example, standalone applications implemented on user equipment devices. For example, the media guidance application may be implemented as software or a set of executable instructions which may be stored in storage 708, and executed by control circuitry 704 of a user equipment device 700. In some embodiments, media guidance applications may be client-server applications where only a client application resides on the user equipment device, and server application resides on a remote server. For example, media guidance applications may be implemented partially as a client application on control circuitry 704 of user equipment device 700 and partially on a remote server as a server application (e.g., media guidance data source 818) running on control circuitry of the remote server. When executed by control circuitry of the remote server (such as media guidance data source 818), the media guidance application may instruct the control circuitry to generate the guidance application displays and transmit the generated displays to the user equipment devices. The server application may instruct the control circuitry of the media guidance data source 818 to transmit data for storage on the user equipment. The client application may instruct control circuitry of the receiving user equipment to generate the guidance application displays.

Content and/or media guidance data delivered to user equipment devices 802, 804, and 806 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 800 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 8.

In one approach, user equipment devices may communicate with each other within a home network. User equipment devices can communicate with each other directly via short-range point-to-point communication schemes described above, via indirect paths through a hub or other similar device provided on a home network, or via communications network 814. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 816 to access content. Specifically, within a home, users of user television equipment 802 and user computer equipment 804 may access the media guidance application to navigate among and locate desirable content. Users may also access the media guidance application outside of the home using wireless user communications devices 806 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 814. These cloud resources may include one or more content sources 816 and one or more media guidance data sources 818. In addition or in the alternative, the remote computing sites may include other user equipment devices, such as user television equipment 802, user computer equipment 804, and wireless user communications device 806. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 804 or wireless user communications device 806 having content capture feature. Alternatively, the user can first transfer the content to a user equipment device, such as user computer equipment 804. The user equipment device storing the content uploads the content to the cloud using a data transmission service on communications network 814. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 7.

As referred herein, the term "in response to" refers to initiated as a result of. For example, a first action being performed in response to a second action may include interstitial steps between the first action and the second action. As referred herein, the term "directly in response to" refers to caused by. For example, a first action being performed directly in response to a second action may not include interstitial steps between the first action and the second action.

Figure 9:
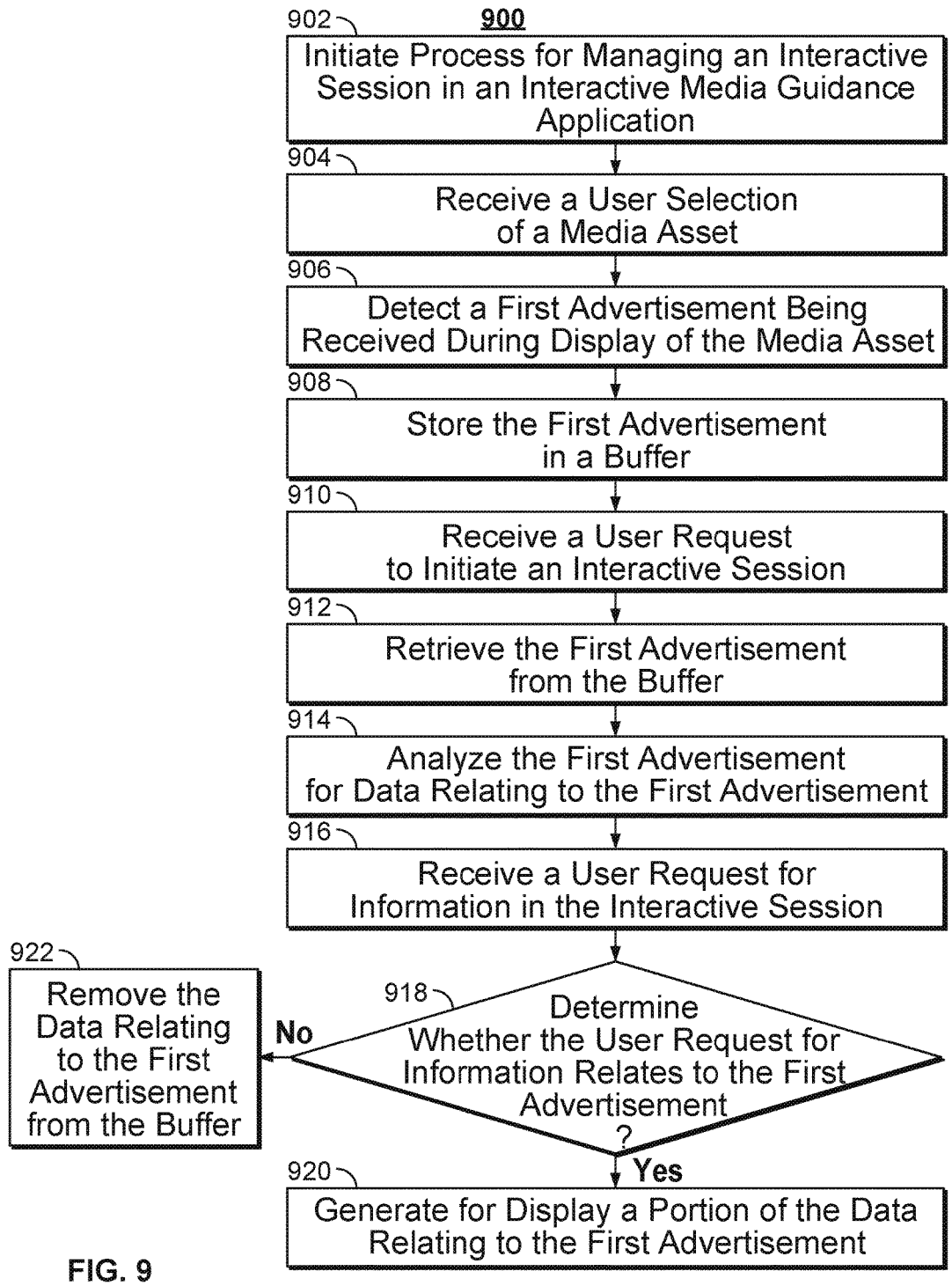
FIG. 9 is a flowchart of an illustrative process for managing an interactive session in an interactive media guidance application in accordance with some embodiments of the disclosure.

FIG. 9 is a flowchart of illustrative process 900 for an interactive media guidance application implemented on control circuitry (e.g., control circuitry 704, FIG. 7) of a user device (e.g., user equipment device 700, FIG. 7) to manage an interactive session in an interactive media guidance application in accordance with some embodiments of the disclosure. In some embodiments, this algorithm may be encoded onto a non-transitory storage medium (e.g., storage device 708) as a set of instructions to be decoded and executed by processing circuitry (e.g., processing circuitry 706). Processing circuitry may in turn provide instructions to other sub-circuits contained within control circuitry 704, such as the tuning, video generating, encoding, decoding, encrypting, decrypting, scaling, analog/digital conversion circuitry, and the like.

At step 902, the interactive media guidance application implemented on control circuitry (e.g., control circuitry 704, FIG. 7) initiates the process for managing an interactive session in the interactive media guidance application.

At step 904, the interactive media guidance application implemented on control circuitry (e.g., control circuitry 704, FIG. 7) receives a user selection of a media asset. The interactive media guidance application generates for display the media asset. For example, the interactive media guidance application may receive a user selection of a television program, such as "SURFERS," and generate for display the television program on a user equipment device.

At step 906, the interactive media guidance application implemented on control circuitry (e.g., control circuitry 704, FIG. 7) detects a first advertisement being received during display of the media asset. In some embodiments, the interactive media guidance application detects the first advertisement being received during the display of the media asset by capturing audio of a portion of the media asset. The interactive media guidance application further determines an audio signature for the audio portion. The interactive media guidance application further compares the audio signature to a plurality of audio signatures for a corresponding plurality of advertisements. The interactive media guidance application further determines that the audio signature matches an audio signature of the plurality of audio signatures. The interactive media guidance application further selects an advertisement, of the plurality of advertisements, corresponding to the audio signature as the first advertisement. For example, the interactive media guidance application may detect an advertisement for an automobile, "BEVRO 411," being received during the display of the television program, "SURFERS."

At step 908, the interactive media guidance application implemented on control circuitry (e.g., control circuitry 704, FIG. 7) stores the first advertisement in a buffer. For example, the interactive media guidance application may store the advertisement for the automobile in a buffer in memory or another suitable location.

At step 910, the interactive media guidance application implemented on control circuitry (e.g., control circuitry 704, FIG. 7) receives a user request to initiate an interactive session. For example, the interactive media guidance application may receive a user request to initiate an interactive session a few seconds after the automobile advertisement is displayed.

At step 912, the interactive media guidance application implemented on control circuitry (e.g., control circuitry 704, FIG. 7) retrieves the first advertisement from the buffer. For example, based on receiving the user request to initiate the interactive session, the interactive media guidance application may retrieve the automobile advertisement stored in the buffer.

At step 914, the interactive media guidance application implemented on control circuitry (e.g., control circuitry 704, FIG. 7) analyzes the first advertisement for data relating to the first advertisement. The interactive media guidance application stores, in the buffer, the data relating to the first advertisement. In some embodiments, the interactive media guidance application analyzes the first advertisement in the buffer for information relating to the first advertisement by retrieving, from the buffer, metadata associated with one or more frames of the first advertisement. The interactive media guidance application further determines, based on the metadata, a plurality of keywords relating to the first advertisement. The interactive media guidance application further stores, in the buffer, the plurality of keywords as the information relating to the first advertisement. For example, the interactive media guidance application may analyze the automobile advertisement to determine that the advertisement relates to "car," "automobile," and "BEVRO 411" and store this data in the buffer.

At step 916, the interactive media guidance application implemented on control circuitry (e.g., control circuitry 704, FIG. 7) receives a user request for information in the interactive session. For example, the interactive media guidance application may receive a user request, "what car was that."

At step 918, the interactive media guidance application implemented on control circuitry (e.g., control circuitry 704, FIG. 7) determines whether the user request for information relates to the first advertisement. In some embodiments, the interactive media guidance application determines whether the user request for information relates to the first advertisement by parsing the user request for information into one or more keywords. The interactive media guidance application further retrieves, from the buffer, the plurality of keywords relating to the first advertisement. The interactive media guidance application further compares the parsed one or more keywords to the plurality of keywords relating to the first advertisement. The interactive media guidance application further determines whether one of the parsed one or more keywords matches one of the plurality of keywords based on the comparison. For example, the interactive media guidance application may determine that the user request "what car was that" does relate to the automobile advertisement, e.g., based on matching keyword, "car," from the user request and the automobile advertisement.

If the interactive media guidance application determines the user request for information relates to the first advertisement, at step 920, the interactive media guidance application implemented on control circuitry (e.g., control circuitry 704, FIG. 7) generates for display a portion of the data relating to the first advertisement. For example, the interactive media guidance application may generate for display a response, "that was the BEVRO 411." The interactive media guidance application may additionally prompt the user as to whether he or she would like more information.

If the interactive media guidance application determines the user request does not relate to the first advertisement, at step 922, the interactive media guidance application implemented on control circuitry (e.g., control circuitry 704, FIG. 7) removes the data relating to the first advertisement from the buffer. In some embodiments, the interactive media guidance application removes the data when the interactive session is completed without a user request for information relating to the first advertisement. For example, the interactive media guidance application may remove the data if the user ends the interactive session without requesting any information regarding the automobile advertisement.

It is contemplated that the steps or descriptions of FIG. 9 may be used with any other embodiment of this disclosure. In addition, the descriptions described in relation to the algorithm of FIG. 9 may be done in alternative orders or in parallel to further the purposes of this disclosure. For example, conditional statements and logical evaluations, such as those at 918, may be performed in any order or in parallel or simultaneously to reduce lag or increase the speed of the system or method. As a further example, in some embodiments several instances of a variable may be evaluated in parallel, using multiple logical processor threads, or the algorithm may be enhanced by incorporating branch prediction. Furthermore, it should be noted that the process of FIG. 9 may be implemented on a combination of appropriately configured software and hardware, and that any of the devices or equipment discussed in relation to FIGS. 7-8 could be used to implement one or more portions of the process.

Figure 10:
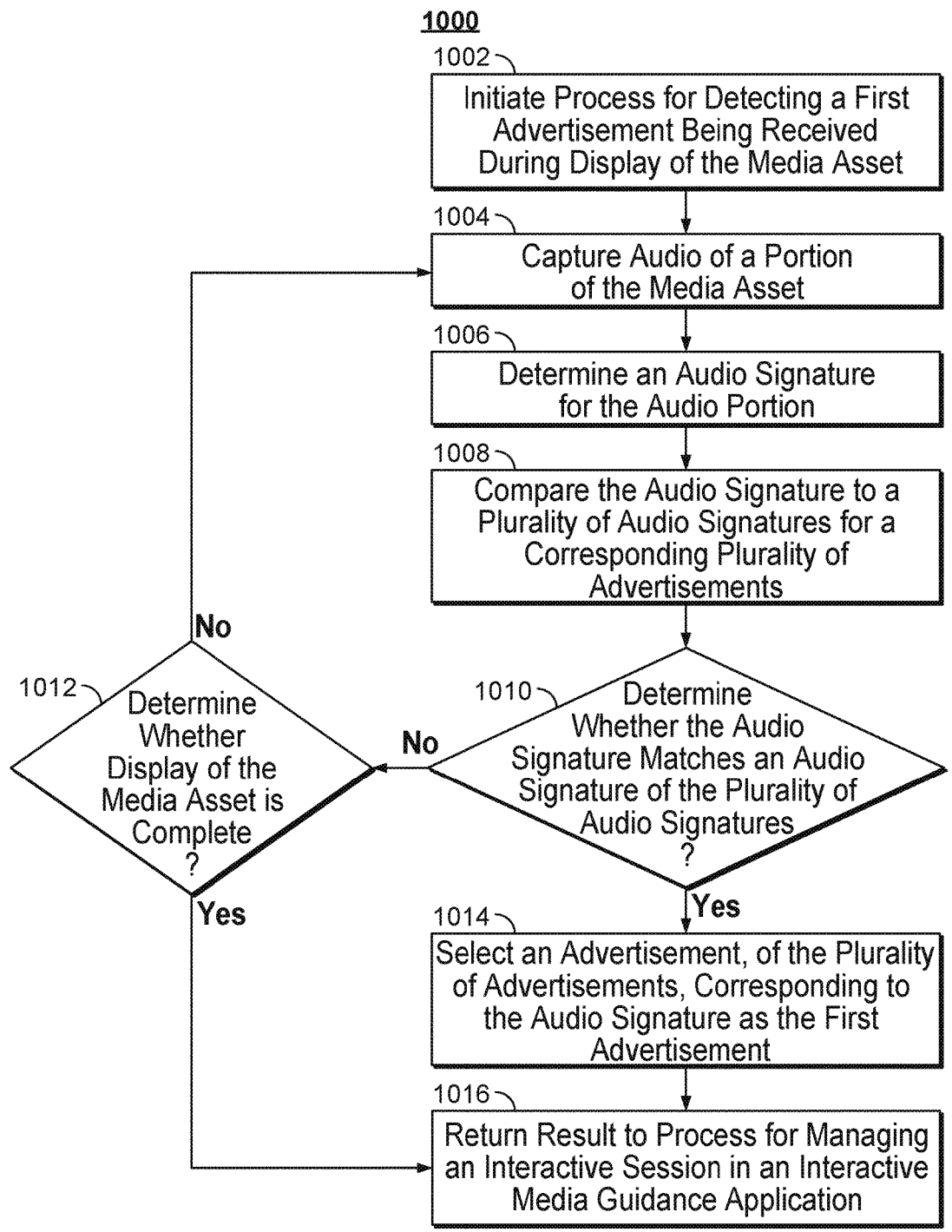
FIG. 10 is a flowchart of an illustrative process for detecting a first advertisement being received during display of the media asset in accordance with some embodiments of the disclosure.

FIG. 10 is a flowchart of illustrative process 1000 for an interactive media guidance application implemented on control circuitry (e.g., control circuitry 704, FIG. 7) of a user device (e.g., user equipment device 700, FIG. 7) to detect a first advertisement being received during display of the media asset in accordance with some embodiments of the disclosure. Process 1000 provides an illustrative process for executing step 906 of process 900 (FIG. 9). In some embodiments, this algorithm may be encoded onto a non-transitory storage medium (e.g., storage device 708) as a set of instructions to be decoded and executed by processing circuitry (e.g., processing circuitry 706). Processing circuitry may in turn provide instructions to other sub-circuits contained within control circuitry 704, such as the tuning, video generating, encoding, decoding, encrypting, decrypting, scaling, analog/digital conversion circuitry, and the like.

At step 1002, the interactive media guidance application implemented on control circuitry (e.g., control circuitry 704, FIG. 7) initiates the process for detecting a first advertisement received during display of the media asset.

At step 1004, the interactive media guidance application implemented on control circuitry (e.g., control circuitry 704, FIG. 7) captures audio of a portion of the media asset.

At step 1006, the interactive media guidance application implemented on control circuitry (e.g., control circuitry 704, FIG. 7) determines an audio signature for the audio portion. For example, the interactive media guidance application may store a sample from 0-5 seconds for each 30 second sample interval. If the audio portion were 3 minutes or 180 seconds long, the audio signature for the audio portion may include 0-5 seconds, 30-35 seconds, 60-65 seconds, 90-95 seconds, 120-125 seconds, and 150-55 seconds. The sample length and sample interval may be varied as needed in order to improve accuracy on one side and to decrease storage size on the other side.

At step 1008, the interactive media guidance application implemented on control circuitry (e.g., control circuitry 704, FIG. 7) compares the audio signature to a plurality of audio signatures for a corresponding plurality of advertisements.

At step 1010, the interactive media guidance application implemented on control circuitry (e.g., control circuitry 704, FIG. 7) determines whether the audio signature matches an audio signature of the plurality of audio signatures. In some embodiments, the interactive media guidance application may compare the audio signature against other audio signatures having the same sample length and interval. The interactive media guidance application may apply a threshold to determine a match. For example, if five out of six samples in the audio signature were found to be a match, the interactive media guidance application may declare an overall match. In some embodiments, the interactive media guidance application may regenerate an audio signature from the audio portion if needed to compare against audio signatures with differing sample lengths and sample intervals.

If the interactive media guidance application determines that the audio signature does not match an audio signature of the plurality of audio signatures, at step 1012, the interactive media guidance application implemented on control circuitry (e.g., control circuitry 704, FIG. 7) determines whether display of the media asset is complete. If the interactive media guidance application determines that the display of the media asset is complete, the interactive media guidance application proceeds to step 1004. If the interactive media guidance application determines that the display of the media asset is not yet complete, the interactive media guidance application proceeds to step 1016.

If the interactive media guidance application determines that the audio signature matches an audio signature of the plurality of audio signatures, at step 1014, the interactive media guidance application implemented on control circuitry (e.g., control circuitry 704, FIG. 7) selects an advertisement, of the plurality of advertisements, corresponding to the audio signature as the first advertisement.

At step 1016, the interactive media guidance application implemented on control circuitry (e.g., control circuitry 704, FIG. 7) returns the result of process 1000 to the process for managing an interactive session, e.g., process 900 (FIG. 9).

It is contemplated that the steps or descriptions of FIG. 10 may be used with any other embodiment of this disclosure.

In addition, the descriptions described in relation to the algorithm of FIG. 10 may be done in alternative orders or in parallel to further the purposes of this disclosure. For example, conditional statements and logical evaluations, such as those at 1010 and 1012, may be performed in any order or in parallel or simultaneously to reduce lag or increase the speed of the system or method. As a further example, in some embodiments several instances of a variable may be evaluated in parallel, using multiple logical processor threads, or the algorithm may be enhanced by incorporating branch prediction. Furthermore, it should be noted that the process of FIG. 10 may be implemented on a combination of appropriately configured software and hardware, and that any of the devices or equipment discussed in relation to FIGS. 7-8 could be used to implement one or more portions of the process.

Figure 11:
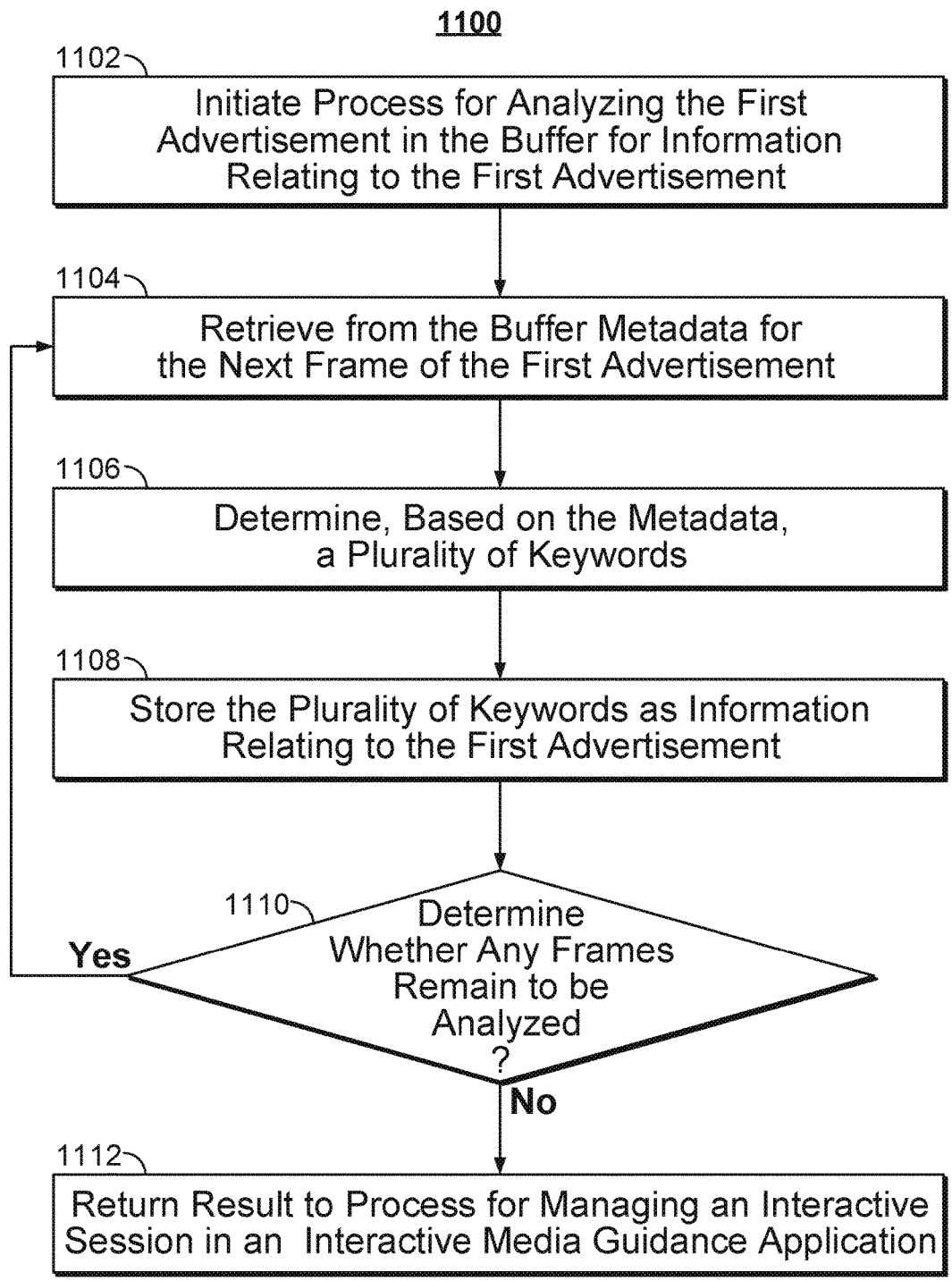
FIG. 11 is a flowchart of an illustrative process for analyzing the first advertisement in the buffer for information relating to the first advertisement in accordance with some embodiments of the disclosure.

FIG. 11 is a flowchart of illustrative process 1100 for an interactive media guidance application implemented on control circuitry (e.g., control circuitry 704, FIG. 7) of a user device (e.g., user equipment device 700, FIG. 7) to analyze the first advertisement in the buffer for information relating to the first advertisement in accordance with some embodiments of the disclosure. Process 1100 provides an illustrative process for executing step 914 of process 900 (FIG. 9). In some embodiments, this algorithm may be encoded onto a non-transitory storage medium (e.g., storage device 708) as a set of instructions to be decoded and executed by processing circuitry (e.g., processing circuitry 706). Processing circuitry may in turn provide instructions to other sub-circuits contained within control circuitry 704, such as the tuning, video generating, encoding, decoding, encrypting, decrypting, scaling, analog/digital conversion circuitry, and the like.

At step 1102, the interactive media guidance application implemented on control circuitry (e.g., control circuitry 704, FIG. 7) initiates the process for analyzing the first advertisement in the buffer for information relating to the first advertisement.

At step 1104, the interactive media guidance application implemented on control circuitry (e.g., control circuitry 704, FIG. 7) retrieves, from the buffer, metadata for the next frame of the first advertisement.

At step 1106, the interactive media guidance application implemented on control circuitry (e.g., control circuitry 704, FIG. 7) determines, based on the metadata, a plurality of keywords. For example, the metadata may include keywords "car," "automobile," and "BEVRO 411" as relating to the first advertisement. In some embodiments, the interactive media guidance application, additionally or alternatively, executes a suitable image processing algorithm on one or more frames of the first advertisement to determine keywords relating to the first advertisement. For example, the interactive media guidance application may execute an optical character recognition algorithm on one or more frames of the first advertisement to determine the keywords.

At step 1108, the interactive media guidance application implemented on control circuitry (e.g., control circuitry 704, FIG. 7) stores the plurality of keywords as information relating to the first advertisement.

At step 1110, the interactive media guidance application implemented on control circuitry (e.g., control circuitry 704, FIG. 7) determines whether any frames of the first advertisement remain to be analyzed. If the interactive media guidance application determines that there are frames of the first advertisement remaining to be analyzed, the interactive media guidance application proceeds to step 1104.

If the interactive media guidance application determines that no frames remain to be analyzed, at step 1112, the interactive media guidance application implemented on control circuitry (e.g., control circuitry 704, FIG. 7) returns the result of process 1100 to the process for managing an interactive session, e.g., process 900 (FIG. 9).

It is contemplated that the steps or descriptions of FIG. 11 may be used with any other embodiment of this disclosure. In addition, the descriptions described in relation to the algorithm of FIG. 11 may be done in alternative orders or in parallel to further the purposes of this disclosure. For example, conditional statements and logical evaluations, such as those at 1110, may be performed in any order or in parallel or simultaneously to reduce lag or increase the speed of the system or method. As a further example, in some embodiments several instances of a variable may be evaluated in parallel, using multiple logical processor threads, or the algorithm may be enhanced by incorporating branch prediction. Furthermore, it should be noted that the process of FIG. 11 may be implemented on a combination of appropriately configured software and hardware, and that any of the devices or equipment discussed in relation to FIGS. 7-8 could be used to implement one or more portions of the process.

Figure 12:
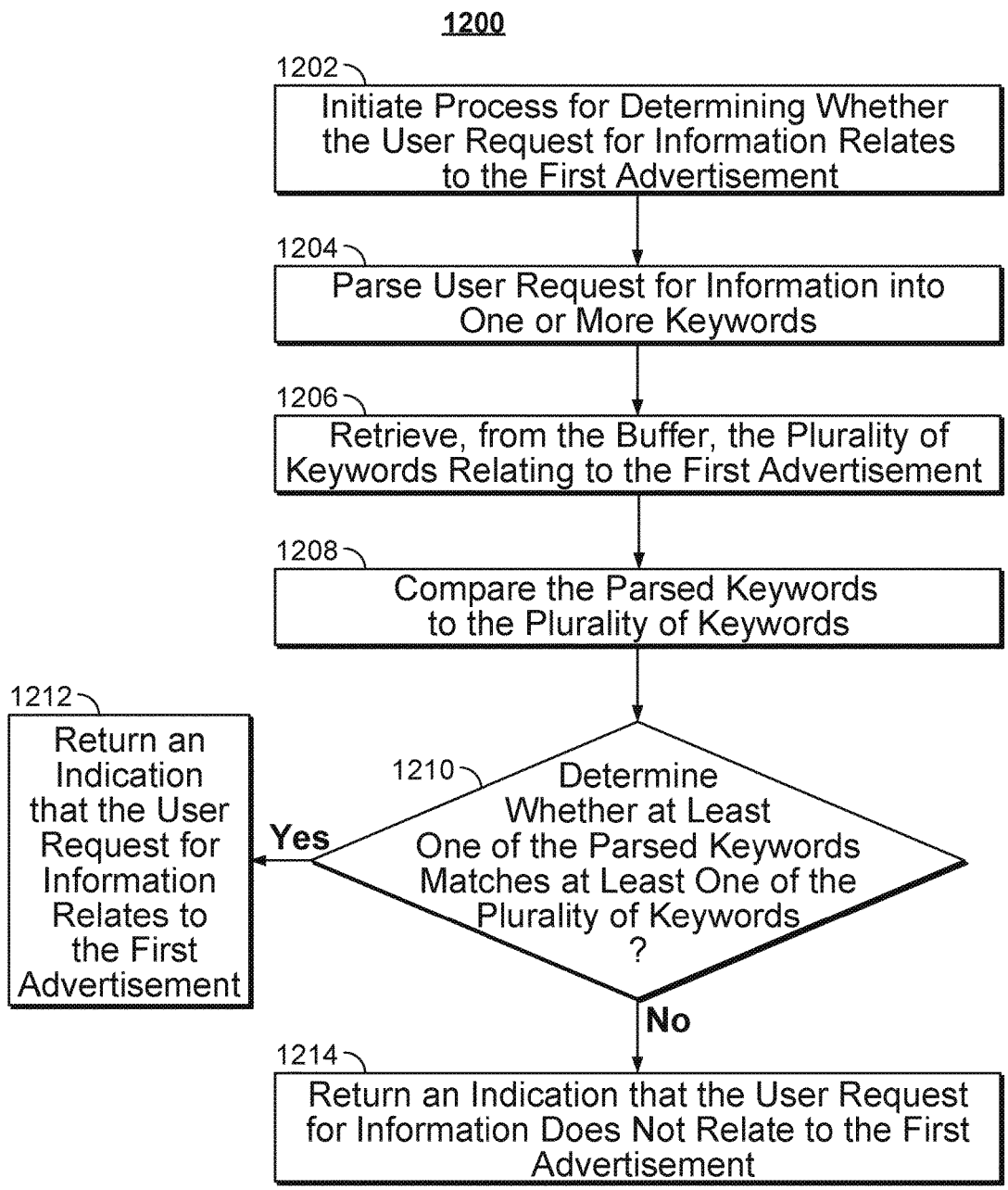
FIG. 12 is a flowchart of an illustrative process for determining whether the user request for information relates to the first advertisement in accordance with some embodiments of the disclosure.

FIG. 12 is a flowchart of illustrative process 1200 for an interactive media guidance application implemented on control circuitry (e.g., control circuitry 704, FIG. 7) of a user device (e.g., user equipment device 700, FIG. 7) to determine whether the user request for information relates to the first advertisement in accordance with some embodiments of the disclosure. Process 1000 provides an illustrative process for executing step 918 of process 900 (FIG. 9). In some embodiments, this algorithm may be encoded onto a non-transitory storage medium (e.g., storage device 708) as a set of instructions to be decoded and executed by processing circuitry (e.g., processing circuitry 706). Processing circuitry may in turn provide instructions to other sub-circuits contained within control circuitry 704, such as the tuning, video generating, encoding, decoding, encrypting, decrypting, scaling, analog/digital conversion circuitry, and the like.

At step 1202, the interactive media guidance application implemented on control circuitry (e.g., control circuitry 704, FIG. 7) initiates the process for determining whether the user request for information relates to the first advertisement.

At step 1204, the interactive media guidance application implemented on control circuitry (e.g., control circuitry 704, FIG. 7) parses the user request for information into one or more keywords. For example, the interactive media guidance application may parse a user request, "what car was that," to determine keyword "car."

At step 1206, the interactive media guidance application implemented on control circuitry (e.g., control circuitry 704, FIG. 7) retrieves, from the buffer, the plurality of keywords relating to the first advertisement. For example, the first advertisement may include related keywords, such as "car," "automobile," and "BEVRO 411."

At step 1208, the interactive media guidance application implemented on control circuitry (e.g., control circuitry 704, FIG. 7) compares the parsed keywords to the plurality of keywords.

At step 1210, the interactive media guidance application implemented on control circuitry (e.g., control circuitry 704, FIG. 7) determines whether at least one of the parsed keywords matches at least one of the plurality of keywords. For example, the interactive media guidance application may determine that the "car" keyword matches, as it is a parsed keyword from the user request and belongs to the plurality of keywords relating to the first advertisement. In some embodiments, the interactive media guidance application may receive and/or automatically determine a threshold number of keywords that need to be matching in order to determine that the user request for information does relate to the first advertisement.

If the interactive media guidance application determines that at least one of the parsed keywords matches at least one of the plurality of keywords, at step 1212, the interactive media guidance application implemented on control circuitry (e.g., control circuitry 704, FIG. 7) returns an indication that the user request for information relates to the first advertisement. Process 1200 may return this indication to the process for managing an interactive session, e.g., process 900 (FIG. 9).

If the interactive media guidance application determines that at least one of the parsed keywords does not match at least one of the plurality of keywords, at step 1214, the interactive media guidance application implemented on control circuitry (e.g., control circuitry 704, FIG. 7) returns an indication that the user request for information does not relate to the first advertisement. Process 1200 may return this indication to the process for managing an interactive session, e.g., process 900 (FIG. 9).

It is contemplated that the steps or descriptions of FIG. 12 may be used with any other embodiment of this disclosure. In addition, the descriptions described in relation to the algorithm of FIG. 12 may be done in alternative orders or in parallel to further the purposes of this disclosure. For example, conditional statements and logical evaluations, such as those at 1210, may be performed in any order or in parallel or simultaneously to reduce lag or increase the speed of the system or method. As a further example, in some embodiments several instances of a variable may be evaluated in parallel, using multiple logical processor threads, or the algorithm may be enhanced by incorporating branch prediction. Furthermore, it should be noted that the process of FIG. 12 may be implemented on a combination of appropriately configured software and hardware, and that any of the devices or equipment discussed in relation to FIGS. 7-8 could be used to implement one or more portions of the process.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method for managing an interactive session in an interactive media guidance application, comprising:
   receiving a user selection of a media asset, wherein the media asset includes a first advertisement and a second advertisement;
   generating for display the media asset;
   detecting the first advertisement being received during the display of the media asset;
   storing, in a buffer, the first advertisement received during the display of the media asset;
   subsequent to the first advertisement being received and prior to the second advertisement being received:
   receiving a user request to initiate an interactive session;
   based on receiving the user request to initiate the interactive session:
   retrieving, from the buffer, the first advertisement received prior to the user request to initiate the interactive session;
   analyzing the first advertisement in the buffer for data relating to the first advertisement;
   storing, in the buffer, the data relating to the first advertisement;
   receiving a user request for information in the interactive session;
   determining whether the user request for information relates to the first advertisement;
   in response to a user request for information being related to the first advertisement, generating for display a portion of the data relating to the first advertisement; and
   detecting the second advertisement being received during the display of the media asset;
   replacing, in the buffer, the first advertisement with the second advertisement received during display of the media asset.

2. The method of claim 1, further comprising:
   based on the user request for information not being related to the first advertisement, removing the data relating to the first advertisement from the buffer.

3. The method of claim 1, further comprising:
   subsequent to the second advertisement being received and prior to completion of the media asset:
   receiving a second user request to initiate a second interactive session;
   based on receiving the second user request to initiate the second interactive session:
   retrieving, from the buffer, the second advertisement received prior to the second user request to initiate the second interactive session;
   analyzing the second advertisement in the buffer for data relating to the second advertisement;
   storing, in the buffer, the data relating to the second advertisement;
   receiving a second user request for information in the second interactive session;
   determining whether the second user request for information relates to the second advertisement;
   based on the second user request for information being related to the second advertisement, generating for display a portion of the data relating to the second advertisement.

4. The method of claim 3, further comprising:
   based on the second user request for information not being related to the second advertisement, removing the data relating to the second advertisement from the buffer.

5. The method of claim 3, further comprising:
   removing the second advertisement from the buffer subsequent to completion of the media asset.

6. The method of claim 1, wherein detecting the first advertisement being received during the display of the media asset comprises:
   capturing audio of a portion of the media asset;

determining an audio signature for the audio portion;
comparing the audio signature to a plurality of audio signatures for a corresponding plurality of advertisements;
determining that the audio signature matches an audio signature of the plurality of audio signatures;
selecting an advertisement, of the plurality of advertisements, corresponding to the audio signature as the first advertisement.

7. The method of claim 1, wherein analyzing the first advertisement in the buffer for information relating to the first advertisement comprises:
retrieving, from the buffer, metadata associated with one or more frames of the first advertisement;
determining, based on the metadata, a plurality of keywords relating to the first advertisement;
storing, in the buffer, the plurality of keywords as the information relating to the first advertisement.

8. The method of claim 7, wherein determining whether the user request for information relates to the first advertisement comprises:
parsing the user request for information into one or more keywords;
retrieving, from the buffer, the plurality of keywords relating to the first advertisement;
comparing the parsed one or more keywords to the plurality of keywords relating to the first advertisement;
determining whether one of the parsed one or more keywords matches one of the plurality of keywords based on the comparison.

9. The method of claim 1, wherein the user request for information is received subsequent to analyzing the first advertisement in the buffer for data relating to the first advertisement and storing, in the buffer, the data relating to the first advertisement.

10. A system for managing an interactive session in an interactive media guidance application, comprising:
a buffer;
control circuitry configured to:
receive a user selection of a media asset, wherein the media asset includes a first advertisement and a second advertisement;
generate for display the media asset;
detect the first advertisement being received during the display of the media asset;
store, in the buffer, the first advertisement received during the display of the media asset;
subsequent to the first advertisement being received and prior to the second advertisement being received:
receive a user request to initiate an interactive session;
based on receiving the user request to initiate the interactive session:
retrieve, from the buffer, the first advertisement received prior to the user request to initiate the interactive session;
analyze the first advertisement in the buffer for data relating to the first advertisement;
store, in the buffer, the data relating to the first advertisement;
receive a user request for information in the interactive session;
determine whether the user request for information relates to the first advertisement;
in response to a user request for information being related to the first advertisement, generate for display a portion of the data relating to the first advertisement;
detect the second advertisement being received during the display of the media asset;
replace, in the buffer, the first advertisement with the second advertisement received during display of the media asset.

11. The system of claim 10, wherein the control circuitry is further configured to:
based on the user request for information not being related to the first advertisement, remove the data relating to the first advertisement from the buffer.

12. The system of claim 10, wherein the control circuitry is further configured to:
subsequent to the second advertisement being received and prior to completion of the media asset:
receive a second user request to initiate a second interactive session;
based on receiving the second user request to initiate the second interactive session:
retrieve, from the buffer, the second advertisement received prior to the second user request to initiate the second interactive session;
analyze the second advertisement in the buffer for data relating to the second advertisement;
store, in the buffer, the data relating to the second advertisement;
receive a second user request for information in the second interactive session;
determine whether the second user request for information relates to the second advertisement;
based on the second user request for information being related to the second advertisement, generate for display a portion of the data relating to the second advertisement.

13. The system of claim 12, wherein the control circuitry is further configured to:
based on the second user request for information not being related to the second advertisement, remove the data relating to the second advertisement from the buffer.

14. The system of claim 12, wherein the control circuitry is further configured to:
remove the second advertisement from the buffer subsequent to completion of the media asset.

15. The system of claim 10, wherein the control circuitry configured to detect the first advertisement being received during the display of the media asset comprises the control circuitry further configured to:
capture audio of a portion of the media asset;
determine an audio signature for the audio portion;
compare the audio signature to a plurality of audio signatures for a corresponding plurality of advertisements;
determine that the audio signature matches an audio signature of the plurality of audio signatures;
select an advertisement, of the plurality of advertisements, corresponding to the audio signature as the first advertisement.

16. The system of claim 10, wherein the control circuitry configured to analyze the first advertisement in the buffer for information relating to the first advertisement comprises the control circuitry further configured to:
retrieve, from the buffer, metadata associated with one or more frames of the first advertisement;
determine, based on the metadata, a plurality of keywords relating to the first advertisement;
store, in the buffer, the plurality of keywords as the information relating to the first advertisement.

17. The system of claim 16, wherein the control circuitry configured to determine whether the user request for information relates to the first advertisement comprises the control circuitry further configured to:
- parse the user request for information into one or more keywords;
- retrieve, from the buffer, the plurality of keywords relating to the first advertisement;
- compare the parsed one or more keywords to the plurality of keywords relating to the first advertisement;
- determine whether one of the parsed one or more keywords matches one of the plurality of keywords based on the comparison.

18. The system of claim 10, wherein the user request for information is received subsequent to analyzing the first advertisement in the buffer for data relating to the first advertisement and storing, in the buffer, the data relating to the first advertisement.

* * * * *

UNITED STATES PATENT AND TRADEMARK OFFICE
CERTIFICATE OF CORRECTION

PATENT NO.         : 10,362,365 B2
APPLICATION NO.    : 15/342658
DATED              : July 23, 2019
INVENTOR(S)        : Patel It is certified that error appears in the above-identified patent and that said Letters Patent is hereby corrected as shown below:

On the Title Page

Item (73), Assignee: change "Ravi" to -- Rovi --.

Signed and Sealed this
Tenth Day of September, 2019

Andrei Iancu
*Director of the United States Patent and Trademark Office*